United States Patent
Bhattad et al.

(10) Patent No.: US 10,841,876 B2
(45) Date of Patent: Nov. 17, 2020

(54) WAKE-UP SIGNAL (WUS) AND WAKE-UP RECEIVER (WUR) IN A COMMUNICATION DEVICE

(71) Applicant: QUALCOMM INCORPORATED, San Diego, CA (US)

(72) Inventors: Kapil Bhattad, Bangalore (IN); Peter Pui Lok Ang, San Diego, CA (US); Alberto Rico Alvarino, San Diego, CA (US); Hao Xu, Beijing (CN); Wanshi Chen, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 75 days.

(21) Appl. No.: 15/885,103

(22) Filed: Jan. 31, 2018

(65) Prior Publication Data
US 2018/0332533 A1   Nov. 15, 2018

(30) Foreign Application Priority Data

May 15, 2017   (IN) .............................. 201741016973

(51) Int. Cl.
| | |
|---|---|
| H04W 52/02 | (2009.01) |
| H04W 74/08 | (2009.01) |
| H04W 72/04 | (2009.01) |
| H04W 72/12 | (2009.01) |
| H04W 76/28 | (2018.01) |
| H04L 5/00 | (2006.01) |

(52) U.S. Cl.
CPC .......... *H04W 52/0216* (2013.01); *H04L 5/00* (2013.01); *H04W 52/0235* (2013.01); *H04W 72/042* (2013.01); *H04W 72/1284* (2013.01); *H04W 74/0833* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2005/0063331 A1* | 3/2005 | Kim | H04W 52/0235 370/328 |
| 2014/0226682 A1* | 8/2014 | Becker | H04B 7/18523 370/474 |
| 2016/0128056 A1* | 5/2016 | Jiang | H04L 5/0092 370/329 |
| 2016/0183112 A1* | 6/2016 | Yang | H04B 17/18 370/252 |
| 2018/0255515 A1* | 9/2018 | Gupta Hyde | H04W 88/08 |

OTHER PUBLICATIONS

International Search Report and Written Opinion—PCT/US2018/027402—ISA/EPO—Jul. 4, 2018 (174309WO).

* cited by examiner

*Primary Examiner* — Adnan Baig
(74) *Attorney, Agent, or Firm* — Steven R. Thiel

(57) ABSTRACT

A method for communication includes a user equipment (UE) periodically awakening to monitor for a wake-up signal (WUS) in a wake-up signal search space, the wake-up signal having a shorter length than a length of a control channel communication to allow the UE to determine whether the UE should monitor for the control channel communication.

31 Claims, 22 Drawing Sheets

WAKE-UP SIGNAL (WUS) AND WAKE-UP RECEIVER (WUR) IN A COMMUNICATION DEVICE

RELATED APPLICATIONS

The benefit of the filing date of India Provisional Patent Application No. 201741016973, filed May 15, 2017, entitled "WAKE-UP SIGNAL (WUS) AND WAKE-UP RECEIVER (WUR) IN A COMMUNICATION DEVICE," is hereby claimed, and the contents thereof are incorporated herein in their entirety by this reference.

TECHNICAL FIELD

The technology discussed below relates to wireless communication systems, and more particularly, to a wake-up signal (WUS) used with a wake-up receiver (WUR) in a communication device. Embodiments enable and provide a low overhead synchronization signal to efficiently awaken a receiver in a communication device.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). An example of an advancement of LTE technology is referred to as 5G. The term 5G represents an advancement of LTE technology including, for example, various advancements to the wireless interface, processing improvements, and the enablement of higher bandwidth to provide additional features and connectivity.

Wireless communications devices, sometimes referred to as user equipment (UE), may communicate with a base station or may communicate directly with another UE. When a UE communicates directly with another UE, the communication is referred to as device-to-device (D2D) communication. In particular use cases, a UE may be a wireless communication device, such as a portable cellular device, or may be a vehicle, such as an automobile, a drone, or may be any other connected device.

A type of communication that sends small amounts of information is referred to as machine-type-communication (MTC). Machine-type-communication generally refers to communications that are characterized by automatic data generation, exchange, processing, and actuation among machines with little or no human intervention.

The Internet of things (IoT), sometimes also referred to as the Internet of everything (IoE), is the inter-networking of physical devices, vehicles (sometimes referred to as "connected devices" and/or "smart devices"), buildings, and other items that may be embedded with electronics, software, sensors, actuators, and network connectivity that enable these objects to collect and exchange data and other information.

Many MTC and IoT communication applications involve the relatively infrequent exchange of small amounts of data. Therefore, it is desirable to minimize the amount of resources used in MTC and IoT communication, and in other communications.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication. Method embodiments include a method for communication including a user equipment (UE) periodically awakening to monitor for a wake-up signal (WUS) in a wake-up signal search space, the wake-up signal having a shorter length than a length of a control channel communication to allow the UE to determine whether the UE should monitor for the control channel communication.

Another aspect of the disclosure provides an apparatus for communication including a user equipment (UE) configured to periodically awaken to monitor for a wake-up signal (WUS) in a wake-up signal search space, the wake-up signal having a shorter length than a length of a control channel communication to allow the UE to determine whether the UE should monitor for the control channel communication.

Another aspect of the disclosure provides a device including means for a user equipment (UE) periodically awakening to monitor for a wake-up signal (WUS) in a wake-up signal search space, the wake-up signal having a shorter length than a length of a control channel communication to allow the UE to determine whether the UE should monitor for the control channel communication.

Another aspect of the disclosure provides a non-transitory computer-readable medium storing computer executable code for communication, the code executable by a processor to cause a user equipment (UE) to periodically awaken to monitor for a wake-up signal (WUS) in a wake-up signal search space, the wake-up signal having a shorter length than a length of a control channel communication to allow the UE to determine whether the UE should monitor for the control channel communication.

BRIEF DESCRIPTION OF THE DRAWINGS

In the figures, like reference numerals refer to like parts throughout the various views unless otherwise indicated. For reference numerals with letter character designations such as "102*a*" or "102*b*", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
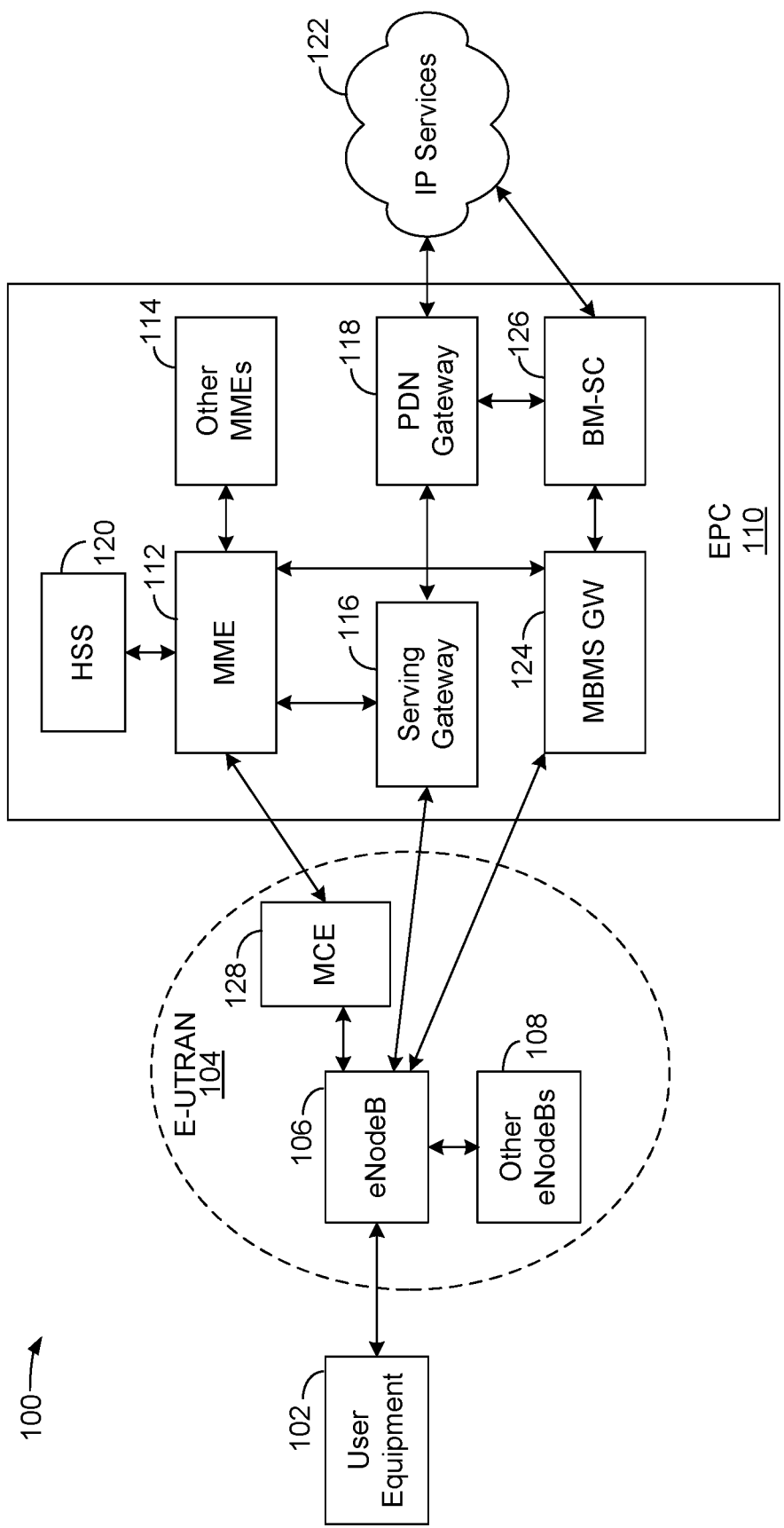
FIG. 1 is a diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

A user equipment (UE) may be in a number of different states. For example, RCC-Connected (Radio Resource Control-Connected) refers to a state where the UE and the base station are connected and the UE is available for exchanging information with the base station. In what is referred to as RCC-Idle (Radio Resource Control-Idle), the UE is in a state in which the UE is not exchanging information with a base station, but where the UE attempts to find and maintain a service connection with the base station.

When a base station and a UE are in the RRC-Idle state, the UE may sleep in two situations. In a first situation, the UE may enter what is referred to as C-DRX (connected-discontinuous reception) mode, where the UE may enter a period of "macro sleep", where it may sleep for up to approximately 0.512 seconds. This may occur during long or short gaps in transmissions from the base station when the UE is in in the C-DRX mode.

In another situation, the UE may enter what is referred to as "micro sleep", where it may sleep for up to 12 symbol periods (approximately 170 micro seconds (µs)). This may occur, for example, when the UE identifies that there is no data (physical downlink shared channel (PDSCH)) scheduled for the current subframe, and may enter a micro sleep mode until the next subframe boundary.

Another DRX state is referred to as eDRX (extended DRX), where the UE may sleep for extended periods of time, on the order of many minutes, or hours. For example, the eDRX state is particularly useful for UE devices where there may be long periods, on the order of minutes or hours, where no transmission is expected. The eDRX state allows a UE to significantly reduce power consumption.

Exemplary embodiments of the disclosure are directed to systems and methods for awakening a receiver in a communication device by sending a small, for example, a one (1) bit transmission, that may alert the receiver that a physical downlink control channel (PDCCH) transmission, or other communication, is present for that communication device. The small, one (1) bit signal may be referred to as a "wake-up signal" (WUS). Other low-bit count signals may also be used as a WUS. A receiver, or a portion of a receiver, may be used to monitor for the wake-up signal. Such a receiver may be referred to as a "wake-up receiver" (WUR). As used herein, the term "wake-up receiver" (WUR) may refer to a separate low power receiver, low power receiver circuitry that is part of another receiver, or a portion of a receiver or a modem in a communication device, that may be operable in a low power consumption state, or for a brief period of time, and be configured to receive the wake-up signal, and process the wake-up signal in order to awaken the receiver only when a communication is destined for that UE.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services; however, as those skilled in the art will readily appreciate, the various concepts presented throughout this disclosure may be extended to networks providing circuit-switched services. Moreover, while an LTE network is illustrated as an example, other types of networks may also be used, including, for example only, a 5G network.

The E-UTRAN 104 includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
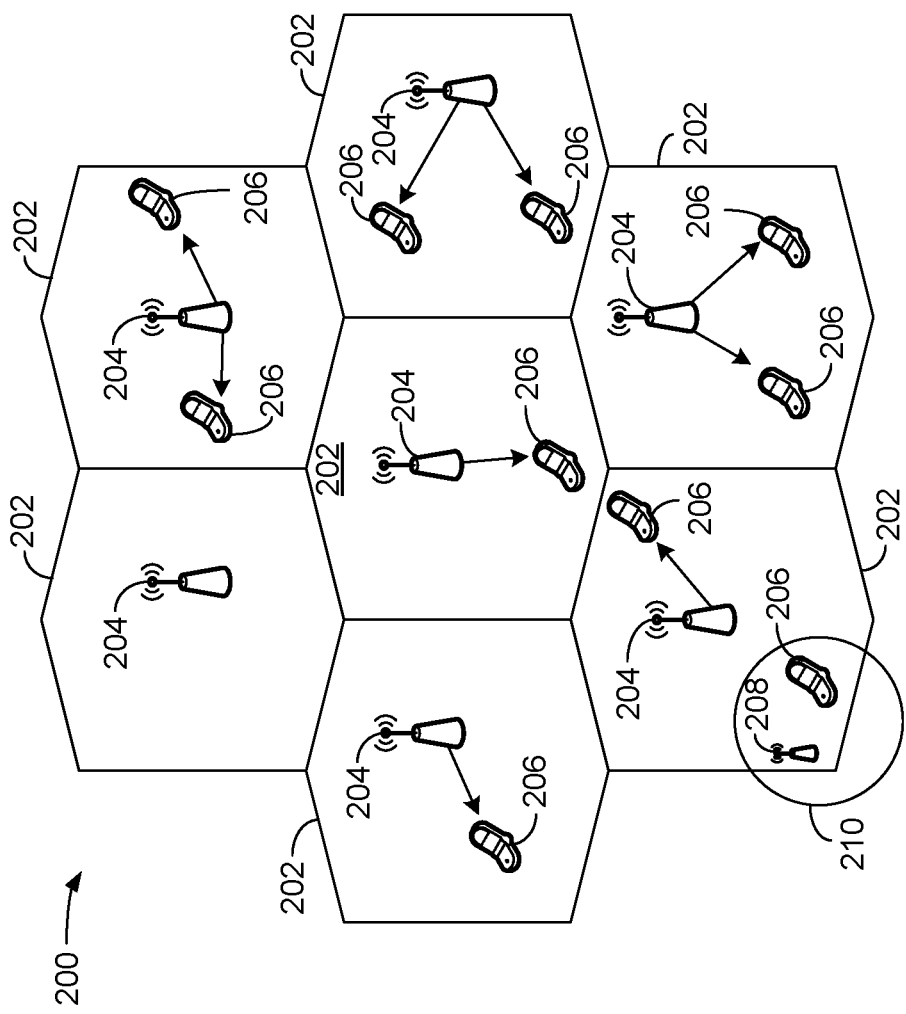
FIG. 2 is a diagram illustrating an example of an access network, in accordance with various aspects of the present disclosure.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO), Ultra Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-TDMA in the form of a DFT-spread OFDM signal to compensate for high peak-to-average power ratio (PAPR).

Figure 3:
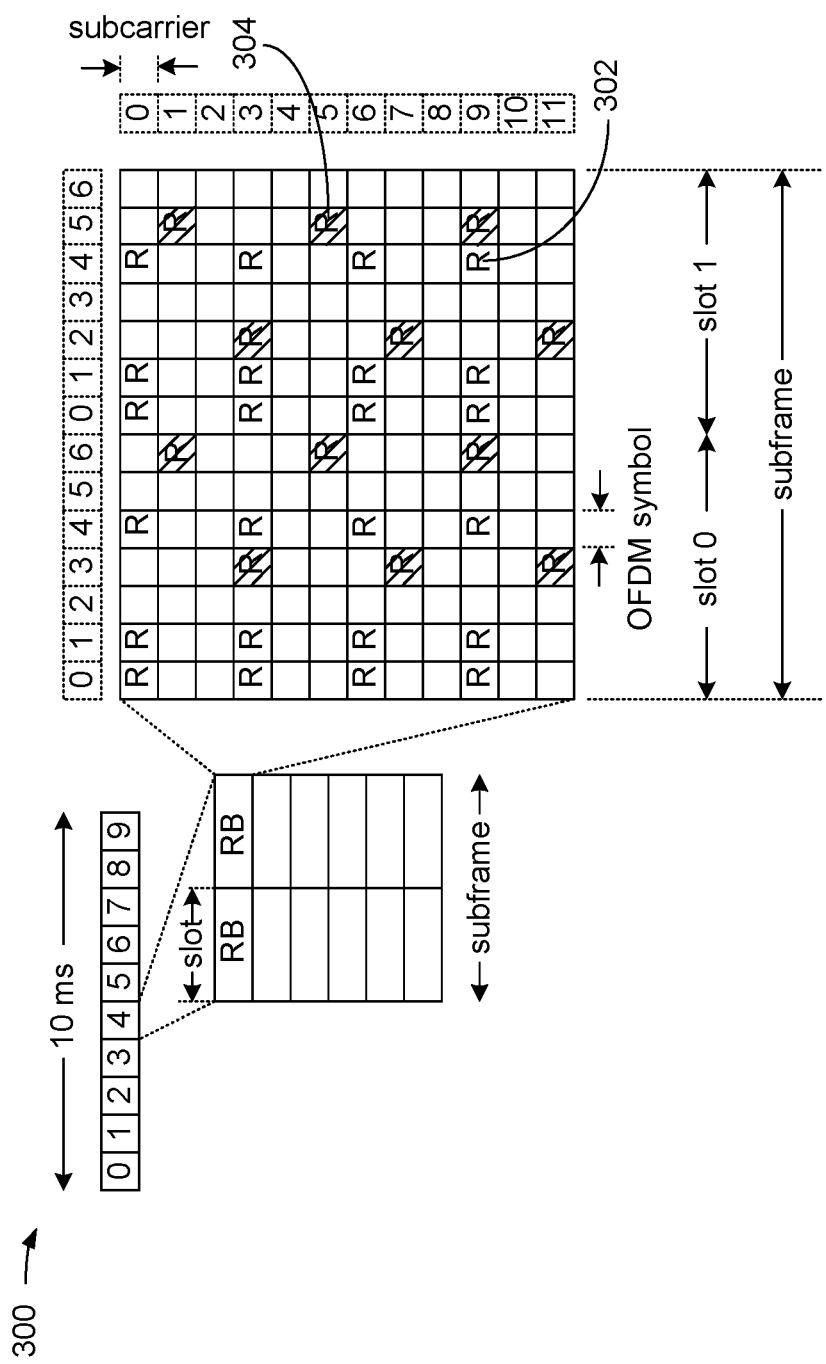
FIG. 3 is a diagram illustrating an example of a DL frame structure in LTE, in accordance with various aspects of the present disclosure.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302, UE-specific RS (UE-RS) 304. For narrowband LTE, a narrowband cell specific reference signal (NRS) may be used. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
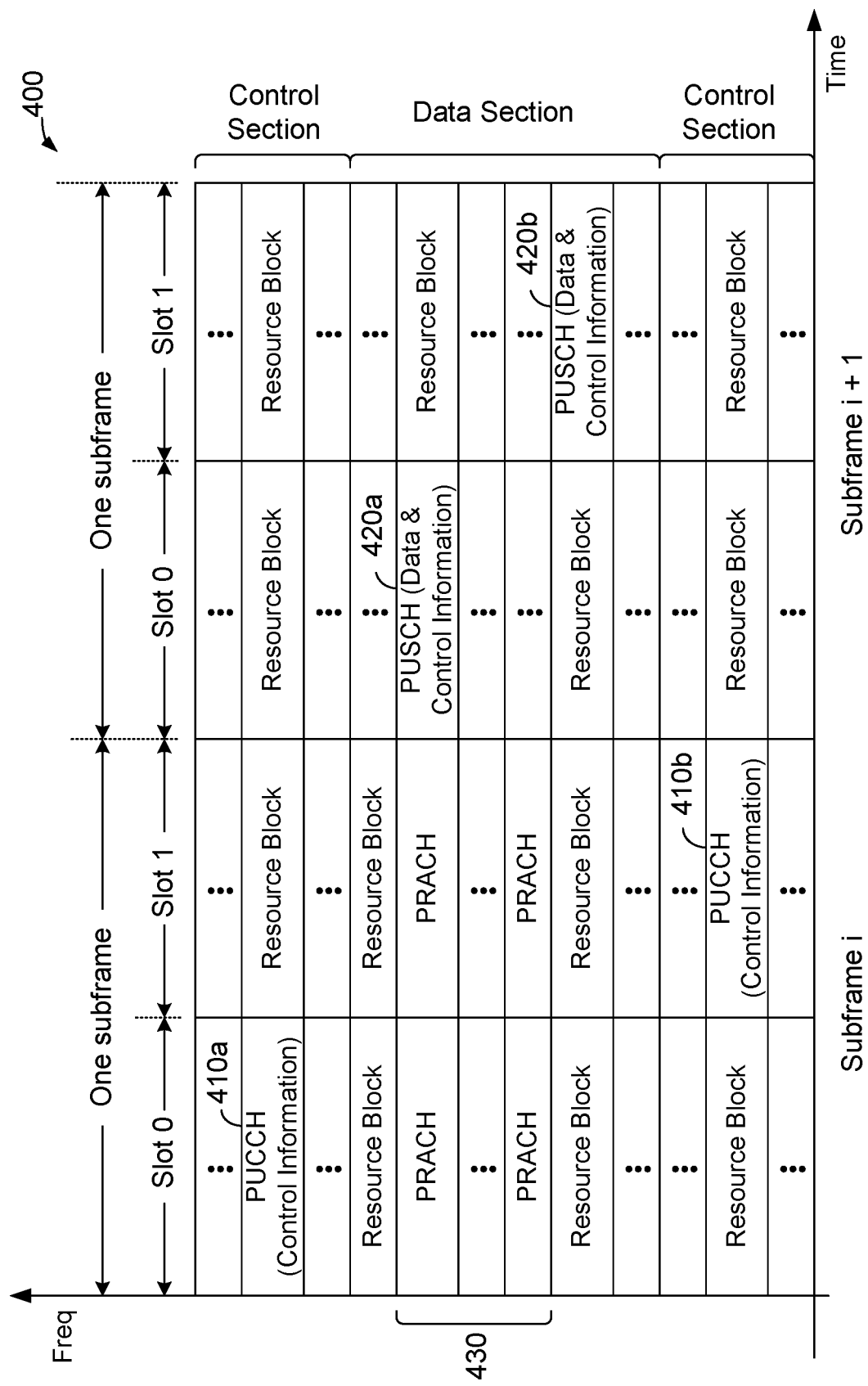
FIG. 4 is a diagram illustrating an example of an UL frame structure in LTE, in accordance with various aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

A described herein in accordance with exemplary embodiments of the present disclosure, initial symbols in the PRACH 430, or, if appropriate, a modified PRACH or NPRACH, can be used by the UE to send small data transmissions for eMTC communications and/or IoT communications prior to the establishment of a radio resource control (RRC) radio communication link between a UE and a base station. As used herein, the term (N)PRACH can be used to refer to a wideband PRACH and/or a narrowband NPRACH.

Figure 5:
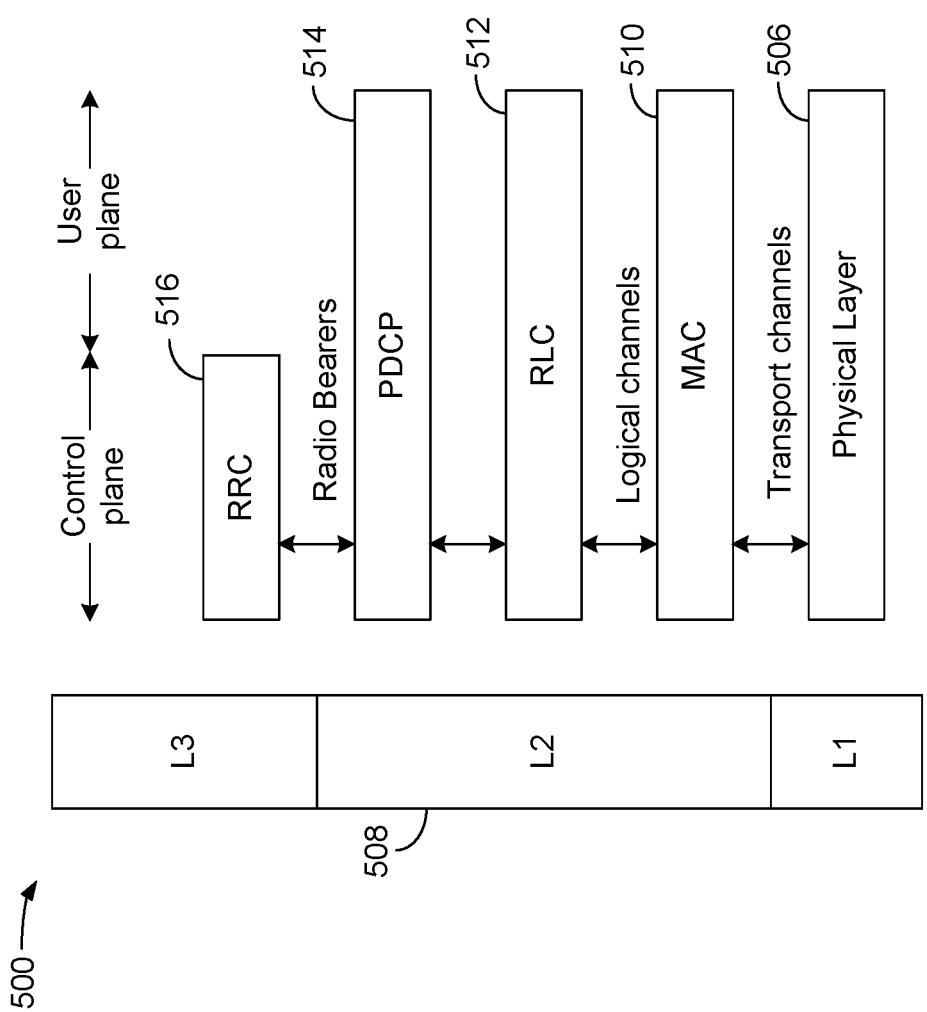
FIG. 5 is a diagram illustrating an example of a radio protocol architecture for the user and control planes in accordance with various aspects of the present disclosure.

FIG. 5 is a diagram 500 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
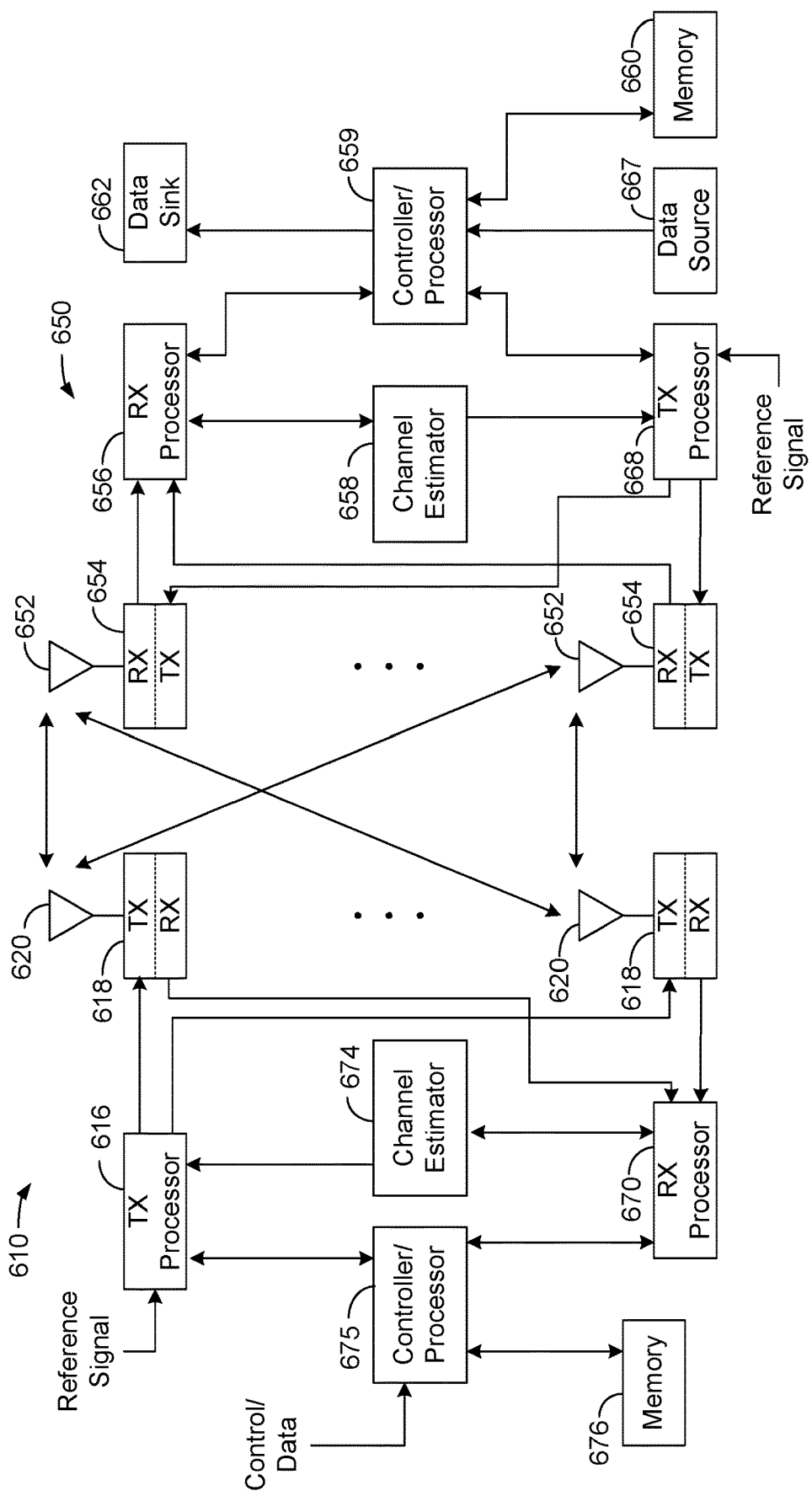
FIG. 6 is a diagram illustrating an example of an evolved Node B and user equipment in an access network in accordance with various aspects of the present disclosure.

FIG. 6 is a block diagram of an eNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer.

Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In an exemplary embodiment, one or both of the eNB 610 and the UE 650 may have logic, software, firmware, configuration files, etc., to allow the MCT/IoT communications described herein.

Figure 7:
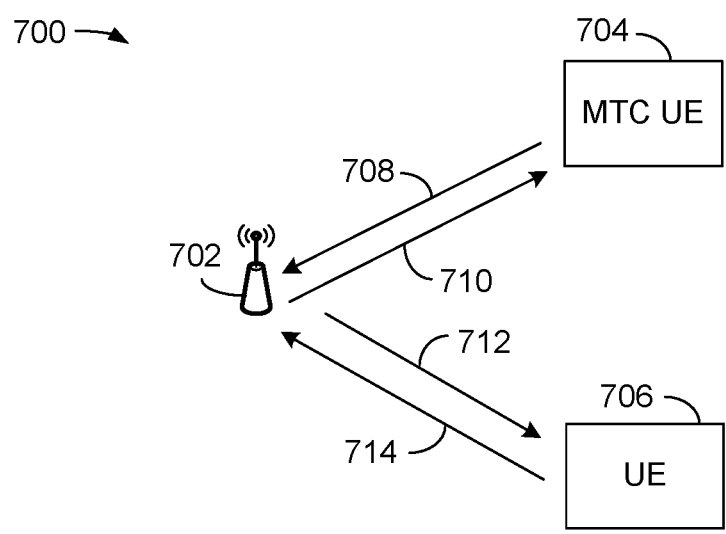
FIG. 7 is a diagram illustrating a communication system in accordance with various aspects of the present disclosure.

FIG. 7 is a diagram 700 illustrating a communication system in accordance with various aspects of the present disclosure. FIG. 7 includes a node 702, an MTC UE 704, and a UE 706 (also referred to as a "non-MTC UE"). The node 702 can be a macro node (e.g., an eNB), femto node, pico node, or similar base station, a mobile base station, a relay, a UE (e.g., communicating in peer-to-peer or ad-hoc mode with another UE), a portion thereof, and/or substantially any component that communicates control data in a wireless network. The MTC UE 704 and non-MTC UE 706 can each be a mobile terminal, a stationary terminal, a modem (or other tethered device), a portion thereof, and/or substantially any device that receives control data in a wireless network.

As shown in FIG. 7, the MTC UE 704 receives DL transmissions 710 from eNB 702 and sends UL transmissions 708 to the eNB 702. In one aspect, the DL and UL transmissions 710 and 708 may include either MTC control information or MTC data. As further shown in FIG. 7, the UE 706 receives DL transmissions 712 from eNB 702 and sends UL transmissions 714 to the eNB 702.

Figure 8:
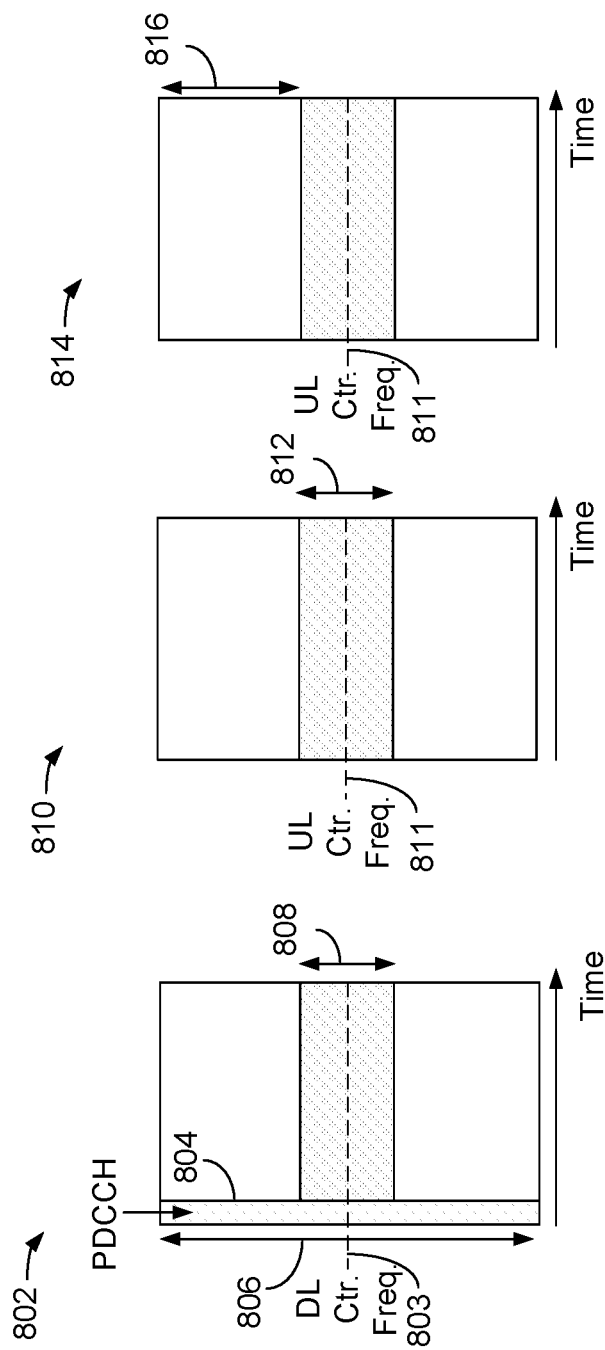
FIGS. 8A, 8B and 8C are diagrams illustrating narrow-band operation of MTC UEs in a large bandwidth allocated for non-MTC UEs in accordance with various aspects of the present disclosure.

FIGS. 8A through 8C are diagrams 802, 810, and 814 illustrating narrowband operation of MTC UEs in a large bandwidth allocated for non-MTC UEs in accordance with various aspects of the present disclosure. FIG. 8A shows a large bandwidth 806 allocated for non-MTC UEs and further shows a DL center frequency 803.

Accordingly, the DL operates in the center of the large bandwidth 806. In the configuration of FIG. 8A, shaded portion 804 is reserved for the physical downlink control channel (PDCCH). As further shown in FIG. 8A, narrow bandwidth 808 can be used for both UL and DL and can be used for a primary synchronization signal (PSS), secondary synchronization signal (SSS), physical broadcast channel (PBCH), SIB, and/or paging. For example, the narrow bandwidth can be 1.25 MHZ. FIG. 8B shows a UL center frequency 811 and the narrow bandwidth 812. For example, UL random access channel (RACH) messages (e.g., message 1 and message 3) can be communicated by MTC UEs in the UL center frequency 811 to facilitate access to the network. As shown in FIG. 8C, other UL transmissions can be communicated in a bandwidth different from narrow bandwidth 808, such as bandwidth 816. It should be understood that in FIGS. 8A through 8C, the small bandwidth 808 can be located in a region other than the center of the large bandwidth 806.

In a specific example, LTE allows the following transmission modes (TMs): TM1 for single antenna port, TM2 for transmit diversity, TM3 for open loop MIMO, TM4 for closed loop MIMO, TM5 for multi-user MIMO, TM6 for single layer closed loop MIMO, TM7 for single layer beamforming with dedicated reference signal (RS), TM8 for dual layer beamforming with dedicated RS, TM9 for MIMO with up to 8 layer transmissions, and TM10 for coordinated multiple point (CoMP). For SIB/MIB transmission, as well as message 2 and message 4 for RACH, the default transmission modes are used: TM1 is used for single and TM2 is used for 2 transmit (Tx) antennas or 4 Tx antennas. The UE can be switched to another transmission mode based on UE specific radio resource control (RRC) signaling.

MIB or physical broadcast channel (PBCH) can contain various information bits, such as bandwidth information bits, physical HARQ indicator channel (PHICH) configuration bits, and SFN bits. The bandwidth information can be four bits; however, such bandwidth information may not be needed for MTC when narrowband operation is used. The PHICH configuration bits can be three bits (e.g., one bit for duration, two bits for PHICH group). However, such PHICH configuration may not be needed if NCT is used or if a fixed control region for PBCH subframe is used. The SFN bits can be eight bits of the most significant bits (MSB) (the other 2 bits from blind decoding of PBCH in 40 ms). The SFN bits can be signaled later in the payload. Antenna information can be conveyed by another signal. PBCH transmission matches around 4 antenna ports, space frequency block code (SFBC) or SFBC-frequency switched transmit diversity (FSTD) is used for antenna numbers of 2 or 4. Combined with 4 timing hypothesis and 3 antenna hypothesis, a total of 12 blind decoding is needed for current PBCH decoding.

Therefore, in order to reduce costs, MTC can be operated in a narrow band, e.g. six resource blocks (RBs). Considering cost saving as well as limited requirement on the data rate, the transmission mode can be restricted only to those without the support of spatial multiplexing.

Figure 9:
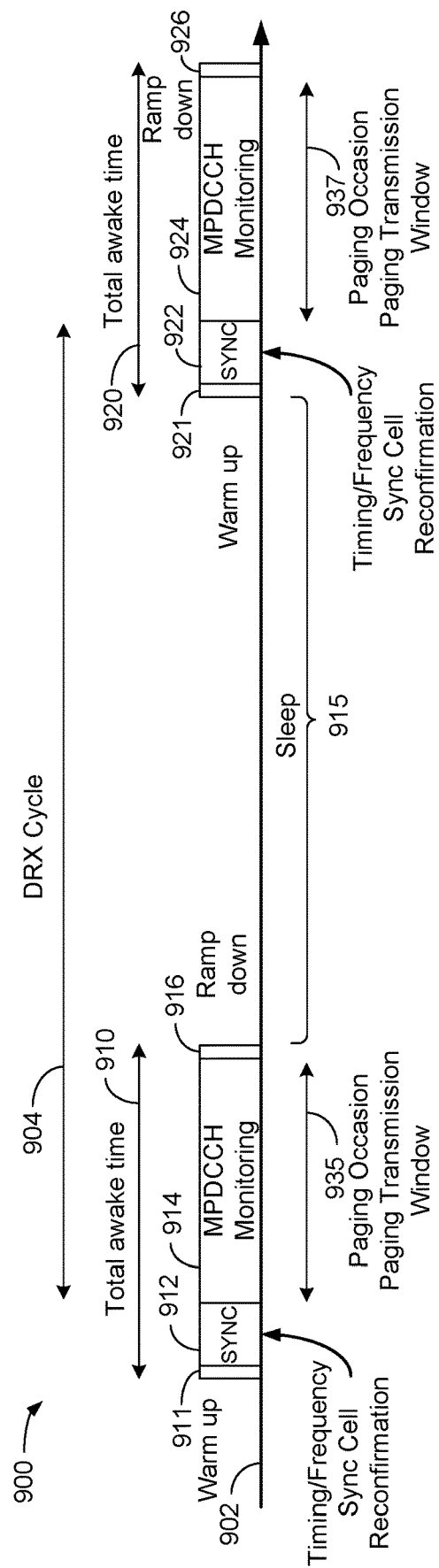
FIG. 9 is a diagram showing an exemplary embodiment of a conventional DRX cycle for a UE in idle mode.

FIG. 9 is a diagram 900 showing an exemplary embodiment of a conventional DRX cycle for a UE in idle mode. The diagram 900 shows a timeline 902, and a DRX cycle 904. An exemplary total awake time for a receiver is shown using reference numeral 910. The total awake time comprises a warm up period 911, a synchronization (SYNC) period 912, a period 914 during which the receiver monitors the MTC physical downlink control channel (MPDCCH), and a ramp down period 916. Similarly, an exemplary total awake time for a receiver is also shown using reference numeral 920. The total awake time comprises a warm up period 921, a synchronization (SYNC) period 922, a period 924 during which the receiver monitors the MTC physical downlink control channel (MPDCCH), and a ramp down period 926. A sleep period 915 extends from the end of the ramp down period 916 to the beginning of the warm up period 921. In an exemplary embodiment, the MPDCCH monitoring period (also referred to as search space) 914 may occur within a paging transmission window (PTW) 935 and the MPDCCH monitoring period (also referred to as search space) 924 may occur in within a paging transmission window 937. Paging occasions from a base station, which may comprise transmissions of MPDCCH (or PDCCH) communications, may occur within the paging transmission window 935 and the paging transmission window 937. The UE monitors for a page from a base station in its paging transmission windows 935 and 937. The UE is in a sleep mode prior to its paging transmission window. The UE awakens slightly earlier than its paging transmission window to obtain timing/frequency synchronization and to reconfirm the serving cell. This is shown in FIG. 9 as the warm up period 911 and the SYNCH period 912 (and the warm up period 921 and SYNC period 922). Once the UE has timing/frequency synchronization, the UE monitors the MTC physical downlink control channel (MPDCCH) during periods 914 and 924, in this example. If there is no page (which is the case shown in FIG. 9), the UE then reenters sleep until the next paging transmission window. The amount of time the UE is awake includes the time for warm up, synchronization, time for monitoring MPDCCH, as well as ramp down time. Since the MPDCCH payload contains several bits, the time to decode MPDCCH can span several 10s of subframes.

In an exemplary embodiment, the awake time of the UE can be substantially reduced by sending, for example, a "1-bit" wake-up signal that lets the UE know ahead of time whether the UE should fully awaken monitor for an MPDCCH (or PDCCH) communication.

Figure 10:
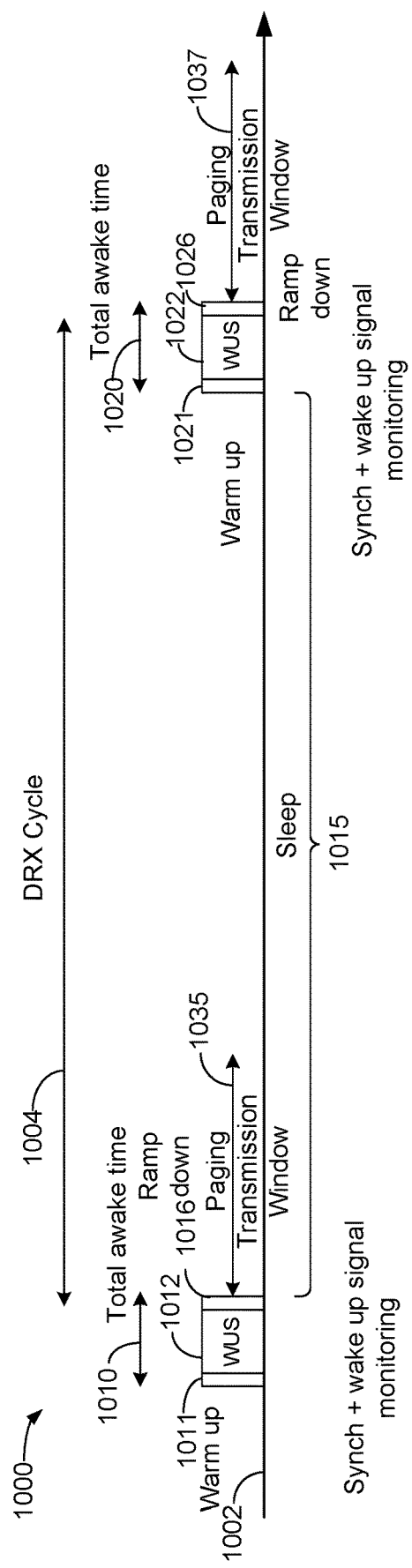
FIG. 10 is a diagram showing an exemplary embodiment of a DRX cycle for a UE in idle mode in which the UE may not awaken.

FIG. 10 is a diagram 1000 showing an exemplary embodiment of a DRX cycle for a UE in idle mode in which the UE may not awaken. The diagram 1000 shows a timeline 1002, and a DRX cycle 1004. An exemplary total awake time for a receiver is shown using reference numeral 1010. The total awake time comprises a warm up period 1011, a wake up signal monitoring period (also referred to as search space) 1012, and a ramp down period 1016. Similarly, an exemplary total awake time for a receiver is also shown using reference numeral 1020. The total awake time comprises a warm up period 1021, a wake up signal monitoring period (also referred to as search space) 1022, and a ramp down period 1026. A sleep period 1015 extends from the end of the ramp down period 1016 to the beginning of the warm up period 1021. In an exemplary embodiment, during the wake-up signal monitoring period 1012 and the wake-up signal monitoring period 1022, the UE synchronizes to the base station and monitors for a wake up signal. In this exemplary embodiment, if the UE does not detect the wake-up signal in the period 1012 or in the period 1022 (or the UE decodes a wake-up signal and the wake-up signal indicates that no MPDCCH (or PDCCH) is present), the UE returns to sleep mode immediately after the ramp down period 1016, or 1026, and does not remain awake to monitor the MPDCCH channel, such that the sleep period 1015 is longer than the sleep period 915 of FIG. 9. Since the length of the wake-up signal is expected to be much smaller than the length of the MPDCCH channel (as the wake-up signal effectively conveys many fewer bits) the time that the UE is awake is significantly reduced and hence the corresponding power consumption is reduced. As shown in FIG. 10, the paging transmission window 1035 and the paging transmission window 1037 do not include the UE monitoring the MPDCCH channel, such that the UE may remain in sleep mode during the paging transmission window 1035 and the paging transmission window 1037.

Figure 11:
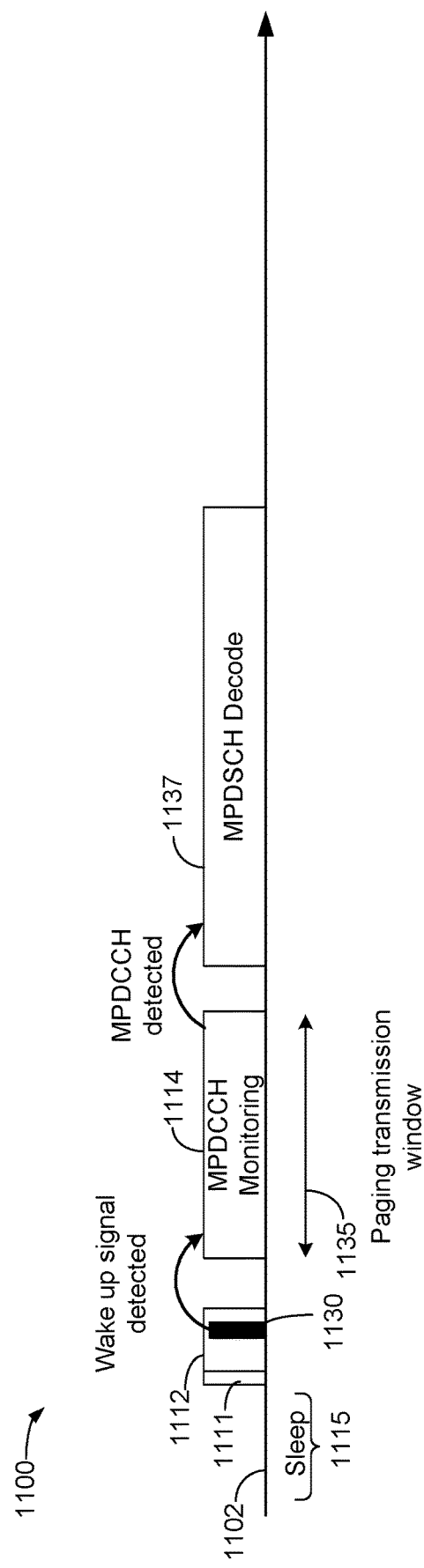
FIG. 11 is a diagram showing exemplary UE processing when a paging signal is sent to the UE.

FIG. 11 is a diagram 1100 showing exemplary UE processing when a paging signal is sent to the UE. In an exemplary embodiment, a timeline 1102 shows that a UE may be in a sleep mode during the time 1115 prior to a ramp up period 1111 and prior to receiving an exemplary wake up signal in the wake-up signal 1130 search space 1112. The ramp up period 1111 may comprise one or more signals, such as pilot signals (CRS/NRS/other pilot signals) that allow a UE to obtain timing and frequency synchronization with a base station. Once the wake-up signal 1130 is detected, the UE will monitor the MPDCCH channel 1114 during a paging transmission window 1135. The paging transmission window refers to a period of time that a base station may be "paging" the UE to awaken the UE so that the UE may receive a data transmission. Once an MPDCCH channel is detected, the UE may receive and decode the associated MTC PDSCH (MPDSCH) channel (data channel) 1137.

Figure 12:
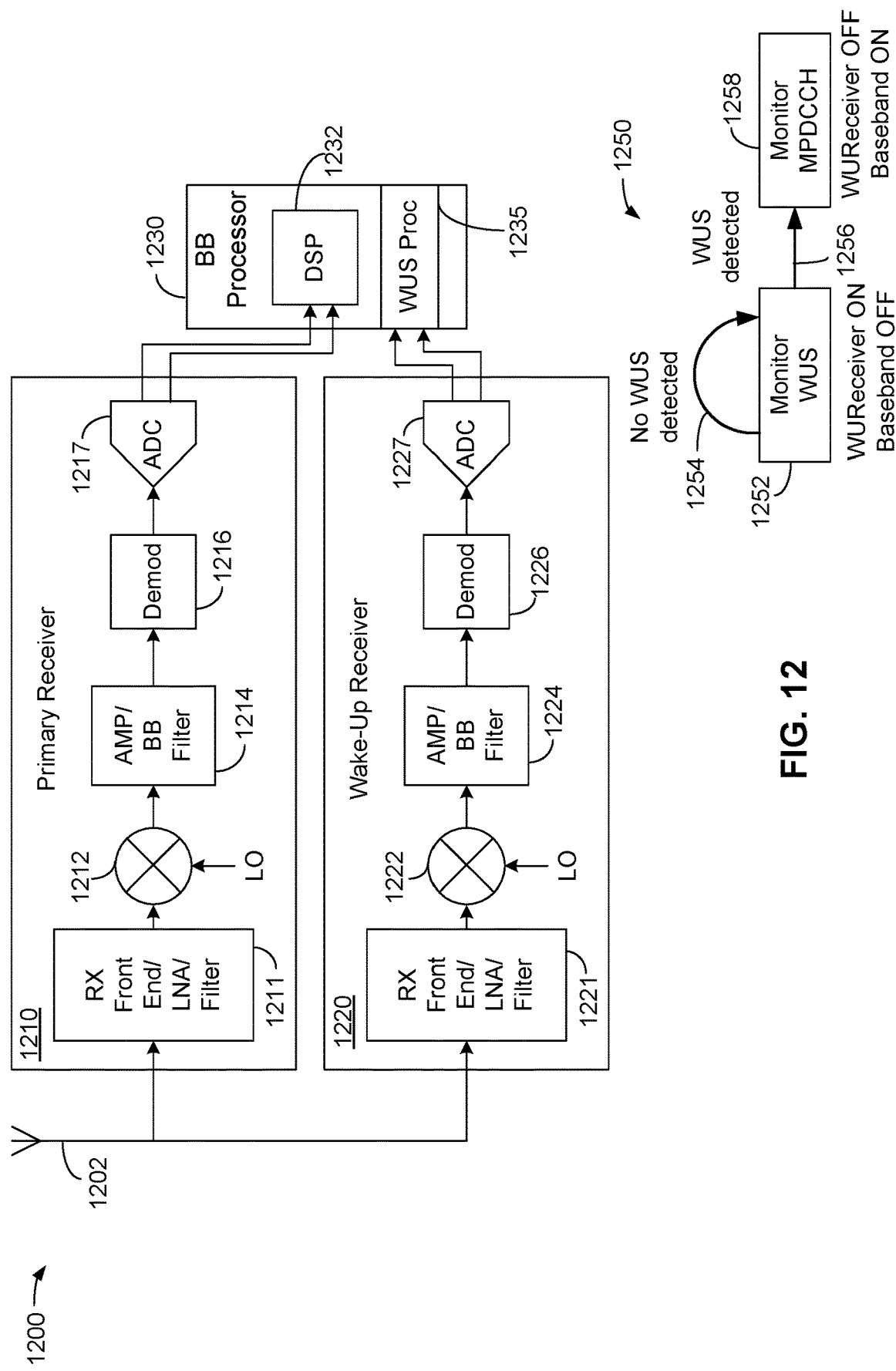
FIG. 12 is a diagram showing an exemplary receiver architecture including a primary receiver, a wake-up receiver and a baseband processor.

FIG. 12 is a diagram 1200 showing an exemplary receiver architecture including a primary receiver 1210, a wake-up receiver 1220 and a baseband processor 1230. The depictions of the primary receiver 1210 and the wake-up receiver 1220 shown in FIG. 12 are intended to represent basic receiver architecture, with details of the primary receiver 1210 and the wake-up receiver 1220 being dependent on application. Those having ordinary skill in the art will recognize that the primary receiver 1210 and the wake-up receiver 1220 may take many different forms. In an exemplary embodiment, the primary receiver 1210 may comprise a receiver front end 1211, a downconverter 1212, an amplifier/baseband filter 1214, a demodulator 1216 and an analog-to-digital converter (ADC) 1217. In an exemplary embodiment, the receiver front end 1211 may comprise one or more of a filter and a low noise amplifier (LNA) configured to receive a radio frequency signal and amplify the received RF signal for further processing. In an exemplary embodiment, the downconverter 1212 may comprise circuitry configured to receive the output of the receiver front end 1211 and downconvert the RF signal using a local oscillator (LO) signal to either an intermediate frequency (IF) signal or to a baseband or near-baseband signal for further processing. In an exemplary embodiment, the amplifier/baseband filter 1214 may be configured to further amplify and/or filter the downconverted signal. In an exemplary embodiment, the demodulator 1216 may be configured to demodulate the received signal to recover the original information signal (the data). In an exemplary embodiment, the ADC 1217 may be configured to convert the analog signal from the demodulator 1216 to digital signals, such as in-phase (I) and quadrature (Q) digital signals representing the information signal. The output of the ADC 1217 may be provided to a baseband processor 1230 for further processing.

In an exemplary embodiment, the wake-up receiver 1220 may comprise a receiver front end 1221, a downconverter 1222, an amplifier/baseband filter 1224, a demodulator 1226 and an analog-to-digital converter (ADC) 1227. In an exemplary embodiment, the receiver front end 1221 may comprise one or more of a filter and a low noise amplifier (LNA) configured to receive a radio frequency signal and amplify the received RF signal for further processing. In an exemplary embodiment, the downconverter 1222 may comprise circuitry configured to receive the output of the receiver front end 1221 and downconvert the RF signal using a local oscillator (LO) signal to either an intermediate frequency (IF) signal or to a baseband or near-baseband signal for further processing. In an exemplary embodiment, the amplifier/baseband filter 1224 may be configured to further amplify and/or filter the downconverted signal. In an exemplary embodiment, the demodulator 1226 may be configured to demodulate the received signal to recover the original information signal (the data). In an exemplary embodiment, the ADC 1227 may be configured to convert the analog signal from the demodulator 1226 to digital signals, such as in-phase (I) and quadrature (Q) digital signals representing the information signal. The output of the ADC 1227 may be provided to the baseband processor 1230 for further processing.

In an exemplary embodiment, the baseband processor 1230 may comprise a digital signal processor 1232 and a wake-up signal processor 1235. The DSP 1232 may be configured to perform one or more digital processing operations to convert the digital information signal received from the ADC 1217 to a usable data signal. In an exemplary embodiment, the wake-up signal processor 1235 may be configured to perform one or more digital processing operations to convert the digital information signal received from the ADC 1227 to a signal that may be used to determine whether the receiver 1210 and the parts of the baseband processor 1230 not used for wake-up signal processing should be activated to process the received signal from the primary receiver 1210. In an exemplary embodiment, the wake-up receiver 1220 may comprise a separate receiver as shown in FIG. 12, or may comprise a portion of the primary receiver 1210 with processing capability tailored to process the wake-up signal 1130 (FIG. 11). Accordingly, the wake-up receiver 1220 may be efficient from a power consumption perspective because it need only process the very small (as small as one (1) bit), wake-up signal. Further, because the wake-up signal may be very small, the portion of the baseband processor resources used to process the wake-up signal, i.e., the wake-up signal processor 1235, may be small compared to the processing capability of the baseband processor 1230, and as such, significant portions of the baseband processor 1230 may be inactive and placed in a power saving state (i.e., a sleep state or sleep mode), when the wake-up signal processor 1235 is monitoring for and/or processing the wake-up signal. In this manner, significant power savings can be achieved for a UE having the wake-up receiver 1220 because nearly all of the circuitry in the baseband processor 1230 may be inactive until it is determined by the wake-up receiver 1220 and wake-up signal processor 1235 that there may be additional data destined for the UE in which the primary receiver 1210 and wake-up receiver 1220 may be located. In this manner, the primary receiver 1210 and significant portions of the baseband processor 1230 may remain in a power saving sleep mode until it is determined that there is received data to process.

The use of the wake-up signal (1130, FIG. 11) generally enables use of power efficient hardware architectures. For example, MPDCCH monitoring involves complex basedband processing; however, detection of a wake-up signal 1130, (FIG. 11) is possible using the low power wake-up receiver 1220. For example, the wake-up receiver 1220 may be configured to perform only correlations on the received signal to detect the presence of the wake-up signal 1130 in the search space 1112 (FIG. 11). The wake-up receiver 1220 is operative only to detect the wake-up signal 1130 (FIG. 11). The full baseband processor 1230 is activated only when the wake-up signal 1130 (FIG. 11) is detected. This enables power savings in addition to the power savings obtained by reducing the awake time of the receiver. Note that the wake-up receiver 1220 and baseband processor 1230 shown in FIG. 12 is conceptual and there are a number of ways to realize the wake-up receiver 1220 in an actual HW implementation, including operating wake-up signal detection as a low power mode functionality of the primary receiver 1210 and baseband processor 1230. Further, some or all of the elements of the primary receiver 1210, wake-up receiver 1220 and the baseband processor 1230 may be implemented in, or part of, the receiver 654RX, Rx processor 656 and/or controller processor 659 of the UE 650 in FIG. 6.

In FIG. 12, a state diagram 1250 may be used to further explain the operation of the wake-up receiver 1220 and baseband processor 1230. In state 1252, the wake-up receiver 1220 is active and monitoring for a wake-up signal. If no wake-up signal is detected in state 1254, the wake-up receiver 1220 and baseband processor 1230 remain in state 1252. When a wake-up signal is detected in state 1256, the wake-up receiver and WUS processor 1235 are deactivated, and the primary receiver 1210 and baseband processor 1230 are activated to monitor the MPDCCH channel in state 1258.

There are a number of different exemplary embodiments for implementing the wake-up signal 1130, wake-up signal search space 1112 (FIG. 11) and the wake-up receiver 1220.

Presence/Density of Pilots

Currently a UE assumes that CRS/NRS/other pilot signals, etc., is/are present around the PDCCH region even if a PDCCH communication may not actually be sent.

In an exemplary embodiment, a UE can assume that one or more pilot signals, such as, for example, NRS/CRS/other pilot signals is/are present around both the PDCCH and around the wake-up signal. For example, for machine type communications when decoding the MPDCCH channel, channel estimates are provided by a CRS or a UE-RS pilot signal. For NB-IoT communications, when decoding the narrowband physical downlink control channel (NPDCCH), channel estimates are provided by an NRS pilot signal. The CRS and NRS pilot signals (and other pilot signals) provide information that allows a UE to obtain measurement reports, achieve timing and frequency synchronization, etc. In exemplary embodiments, a wake-up signal may use a channel estimate from these pilot signals to decode the wake-up signal. In other exemplary embodiments, the wake-up signal may be detectable by itself without using a pilot signal. The pilot signals may still be used for timing/frequency synchronization and measurement reports as mentioned above, which may be done in parallel with the wake-up signal monitoring. In another exemplary embodiment, a wake-up signal may be designed to serve all these purposes and thus the use of pilot signals during wake-up signal monitoring may be reduced further.

In an exemplary embodiment, the UE can assume that NRS/CRS/other pilot signals is/are always present around the wake-up signal, but only present around the PDCCH region when the wake-up signal is actually transmitted (i.e. PDCCH is actually present).

In an exemplary embodiment, the UE can assume that one or more pilot signals are present around both the wake-up signal and the PDCCH only when the PDCCH and wake-up signal are actually transmitted.

Different exemplary embodiments may be chosen based on, for example, the type of PDCCH (paging, single cell multicast control channel (SC-MCCH), single cell multicast traffic channel (SC-MTCH), random access response (RAR)), mode (connected mode/idle mode), carrier/frequency location (anchor/non-anchor carrier, center 6 resource blocks (RBs) or other RBs in the system).

In an exemplary embodiment, the density of the pilot signals in the vicinity of the wake-up signal may be increased to enable faster synchronization/more accurate channel parameter measurements in shorter time resulting in improved performance, etc.

In an exemplary embodiment, increasing the density of the pilot signals in the vicinity of a wake-up signal may be done only when the wake-up signal is present.

In an exemplary embodiment, the density of the pilot signals may be a function of the length of the wake-up signal/Rmax (maximum number of repetitions of the PDCCH communication), etc.

Faster Deep Sleep in eDRX

In an exemplary embodiment, when a UE is in eDRX mode, an eNB (base station) may configure more than one PDCCH search space to monitor (paging transmission window (PTW)) for scheduling flexibility. For example, there might be multiple UEs to schedule/other higher priority traffic and the base station may not be able to always schedule the paged UEs in the first paging transmission search space.

In an exemplary embodiment, a UE has to monitor all these paging transmission search spaces before it can go back to deep sleep. In between these search spaces the UE is only entering light sleep as the time is short.

In an exemplary embodiment, since the wake-up signal is smaller in length, (for example, one (1) bit) or a fewer number of bits than a bit count of a PDCCH communication, scheduling a wake-up signal generally uses fewer resources that does scheduling a PDCCH (or MODCCH) communication. Accordingly, the base station could configure just one wake-up signal, but still have multiple PDCCH search spaces. In the DRX/eDRX cycle where no PDCCH communication is sent to the UE, when the wake-up signal is configured, the UE would monitor the wake-up signal search space, not detect it since the wake-up signal is not sent when the PDCCH communication is not sent, and then the UE would reenter deep sleep. In an exemplary embodiment, if the UE was not configured to monitor for the wake-up signal, the UE would have had to monitor all the PDCCH search spaces and hence would have expended more power.

In an exemplary embodiment, there are generally fewer wake-up signals than PDCCH search spaces.

In an exemplary embodiment, the spacing between multiple wake-up signals can be smaller than (or more generally configured independently of) the PDCCH search space. This enables the UE to enter deep sleep faster if no wake-up signal or PDCCH communication is sent to the UE.

In an exemplary embodiment, the wake-up signal may also carry information about the number of DRX cycles to monitor for a PDCCH communication within an eDRX period, and information about the location of the PDCCH search spaces to monitor within an eDRX cycle.

Software (SW) Image

In an exemplary embodiment, in eDRX mode, the loading of the SW image in the UEs processor can be a large part of the power consumption. This large power consumption can be reduced by first loading only a portion of the software code used for wake-up signal processing and then loading the balance of the software code, such as the code for decoding PDCCH/PDSCH/Tx, etc., only if the wake-up signal is detected by the UE.

In an exemplary embodiment, the time between the wake-up signal and the PDCCH may be large in eDRX mode in which the SW image frequently reloads, etc.

In an exemplary embodiment, when a UE is in connected DRX/idle DRX/small eDRX cycles, the gap between the wake-up signal and corresponding PDCCH may be smaller than that for larger eDRX cycles. Generally, the gap between the wake-up signal and the PDCCH may be a function of the mode/DRX cycle/eDRX cycle.

In an exemplary embodiment, the UE may signal to a base station information about the gap between the wake-up signal and the PDCCH that it requests potentially as a function of the DRX/eDRX cycle length.

Wake Up Signal Length

In an exemplary embodiment, the length of the wake-up signal can be a function of Rmax/repetition factor used for a corresponding PDCCH communication. The term "Rmax" refers to maximum repetition number of times that a base station may send a PDCCH communication.

In an exemplary embodiment, the length of the wake-up signal can also be a function of TxD (transmit diversity)/frequency hopping plan/DRX cycle length and other explicitly or implicitly configured parameters.

In an exemplary embodiment, if the wake-up signal benefits from TxD, the length of the wake-up signal for a given signal to noise ratio (SNR) may be smaller than a length of a wake-up signal without TxD.

In an exemplary embodiment, with TxD, PDCCH performance usually improves and Rmax can be configured to be smaller than without TxD. If the length of the wake-up signal is chosen to be proportional to Rmax, the TxD performance gain may be captured indirectly through Rmax. However, the TxD gains for the wake-up signal may be smaller than that for PDCCH and hence for more flexibility the mapping from Rmax to wake-up signal length could be a function of TxD.

Similar considerations also apply to frequency hopping. The wake-up signal may benefit from a frequency hopping plan to a lesser extent than does the PDCCH communication.

In an exemplary embodiment, depending on the length of the DRX cycle, with a longer DRX cycle the timing/frequency error increases and so the wake-up signal may possibly be longer as the DRX cycle increases.

In an exemplary embodiment, the length of the wake-up signal may be explicitly configured by a radio resource control (RRC) communication (e.g. similar to configuring Rmax).

Wake-Up Signal Search Space

Figure 13:
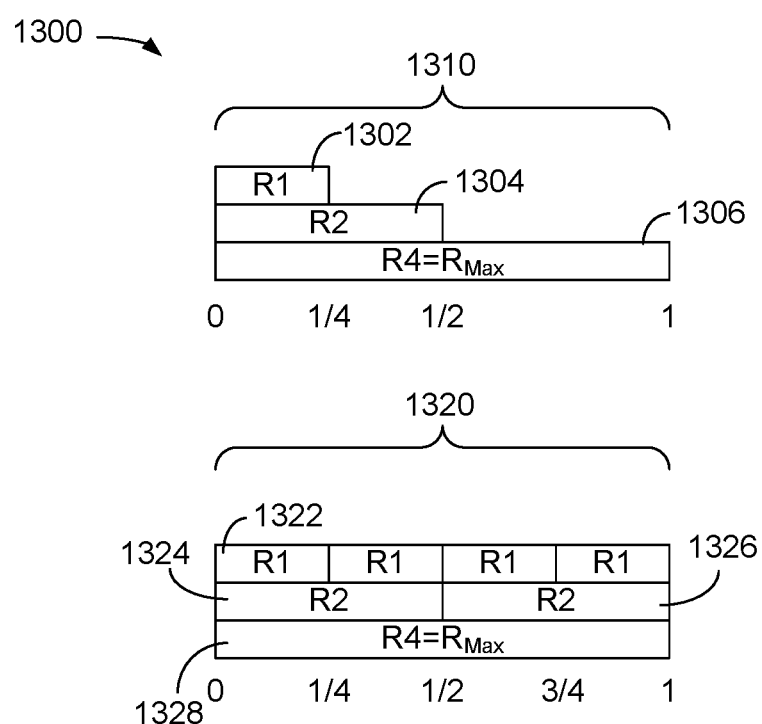
FIG. 13 is a diagram illustrating two possible options for wake-up signal (WUS) search space.

FIG. 13 is a diagram 1300 illustrating two possible options for wake-up signal search space. A wake-up signal search space may be configured in a manner similar to the manner in which a PDCCH (or NPDCCH or MPDCCH) search space is configured. In a first exemplary embodiment, for decoding a PDCCH (or NPDCCH or MPDCCH) communication, a UE may be configured with a search space where the PDCCH communication may be sent by a base station a maximum repetition number of times, referred to as Rmax. A UE may be similarly configured with a wake-up signal search space, where the wake-up signal may be sent by a base station also using the maximum repetition number of times, Rmax, to determine a wake-up signal search space. The actual number of repetitions used by the base station to send a wake-up signal may be smaller than Rmax. In an exemplary embodiment, a UE searches the PDCCH, and may similarly search for the wake-up signal, for all possible communication sizes that a base station can use to send the PDCCH (and to send the wake-up signal) and for different starting locations of the PDCCH, or wake-up signal, within the search space that the base station is allowed to use. In a first exemplary embodiment, in FIG. 13, the combinations include a size R1 1302 starting at location 0 in the search space 1310, a size R2 1304 starting at location 0 in the search space 1310 and a size R4 1306 starting at location 0 in the search space 1310. Therefore, a UE may try three hypotheses for locating a PDCCH transmission and/or a wake-up signal transmission from a base station. In an alternative exemplary embodiment, in FIG. 13, a size R1 PDCCH 1322 (or wake-up signal) can be sent in one of four locations starting at location 0 in the search space 1320, a location ¼ of the way through the search space 1320, a location ½ of the way through the search space 1320, and a location that is ¾ way through the search space 1320. A size R2 PDCCH 1324 (or wake-up signal) can be sent starting at the beginning, location 0, of the search space 1320 a size R2 PDCCH 1326 (or wake-up signal) can be sent at a location ½ of the way through the search space 1320. A size R4 PDCCH 1328 (or wake-up signal) can only be sent starting at the beginning, location 0, of the search space 1320. Therefore, using the two exemplary embodiments described above, a UE may attempt seven (7) hypotheses for locating a PDCCH communication and/or a wake-up signal communication.

Figure 14:
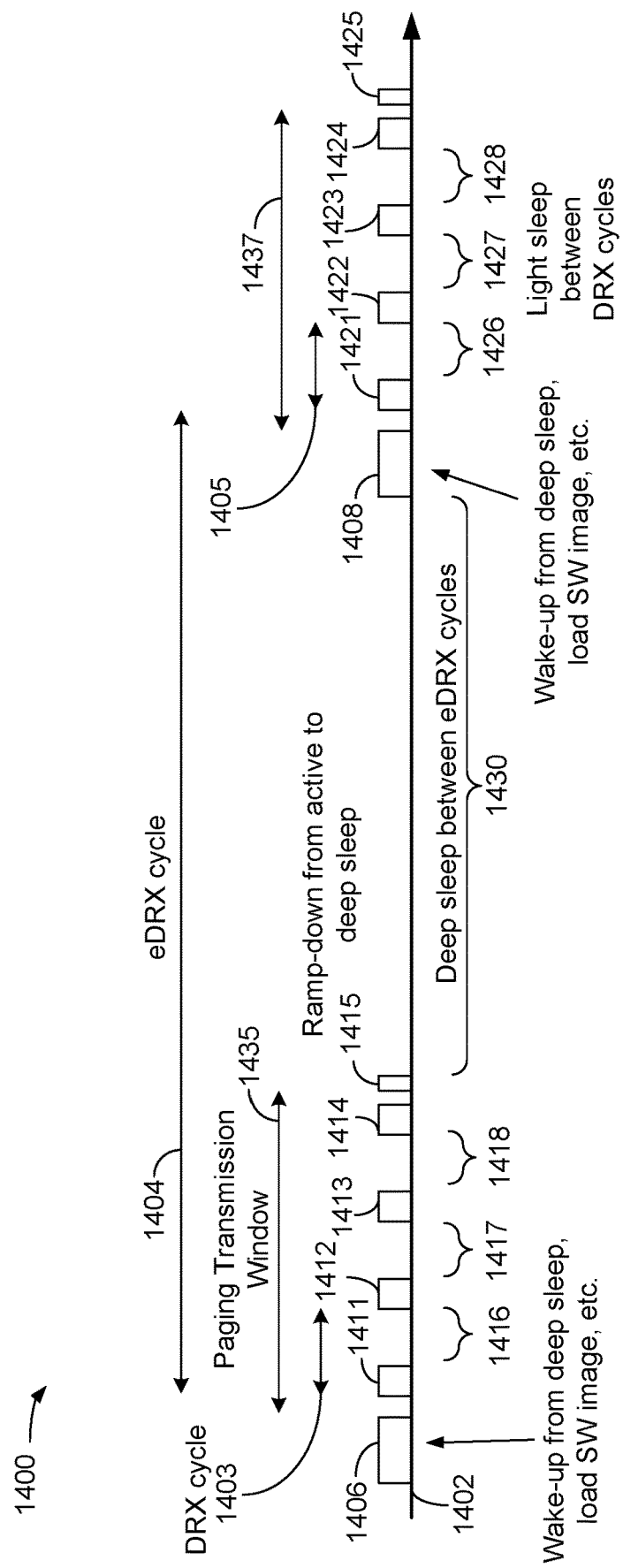
FIG. 14 is a diagram showing an exemplary embodiment of a conventional eDRX cycle for a UE.

FIG. 14 is a diagram 1400 showing an exemplary embodiment of a conventional eDRX cycle for a UE. In an exemplary embodiment, the eDRX cycle 1404 is shown on a UE timeline 1402. A wake-up period 1406 occurs during which time a UE awakens from a deep sleep period. During the wake-up period 1406, the UE may load its full software (SW) image files and may perform other functions that allow it to awaken and monitor a PDCCH channel A paging transmission window 1435 occurs after the wake-up period 1406. The paging transmission window 1435 is a time period during which the UE is awake and monitoring a PDCCH channel to determine whether a base station has any information destined for that UE, and during which the UE may decode the PDCCH channel to alert a base station that the UE may have information to transmit to the base station. In this exemplary embodiment, the paging transmission window 1435 may comprise a number of PDCCH monitoring periods, with PDCCH monitoring periods 1411, 1412, 1413 and 1414 shown as illustrative examples only. After the PDCCH monitoring periods, the paging transmission window 1435 concludes with a ramp-down period 1415, during which time the UE ramps down and reenters a deep sleep state 1430. The paging transmission window 1435 also shows a DRX cycle 1403, which may include one PDCCH monitoring period 1411 followed by a time period 1416 where the UE may enter a light sleep state. Similarly, the PDCCH monitoring period 1412 may be followed by a time period 1417 where the UE may enter a light sleep state, and the PDCCH monitoring period 1413 may be followed by a time period 1418 where the UE may enter a light sleep state. Light sleep may also occur between the last PDCCH monitoring period 1414 and the ramp-down period 1415.

Similarly, a wake-up period 1408 may occur after the deep sleep state 1430, during which time a UE again awakens from a deep sleep period. During the wake-up period 1408, the UE may load its full software (SW) image files and may perform other functions that allow it to awaken and monitor a PDCCH channel. A paging transmission window 1437 occurs after the wake-up period 1408. The paging transmission window 1437 is a time period during which the UE is awake and monitoring a PDCCH channel to determine whether a base station has any information destined for that UE, and during which the UE may decode the PDCCH channel to alert a base station that the UE may have information to transmit to the base station. In this exemplary embodiment, the paging transmission window 1437 may comprise a number of PDCCH monitoring periods, with PDCCH monitoring periods 1421, 1422, 1423 and 1424 shown as illustrative examples only. After the PDCCH monitoring periods, the paging transmission window 1437 concludes with a ramp-down period 1425, during which time the UE ramps down and reenters another deep sleep state (not shown). The paging transmission window 1437 also shows a DRX cycle 1405, which may include one PDCCH monitoring period 1421 followed by a time period 1426 where the UE may enter a light sleep state. Similarly, the PDCCH monitoring period 1422 may be followed by a time period 1427 where the UE may enter a light sleep state, and the PDCCH monitoring period 1423 may be followed by a time period 1428 where the UE may enter a light sleep state. Light sleep may also occur between the last PDCCH monitoring period 1424 and the ramp-down period 1425.

Figure 15:
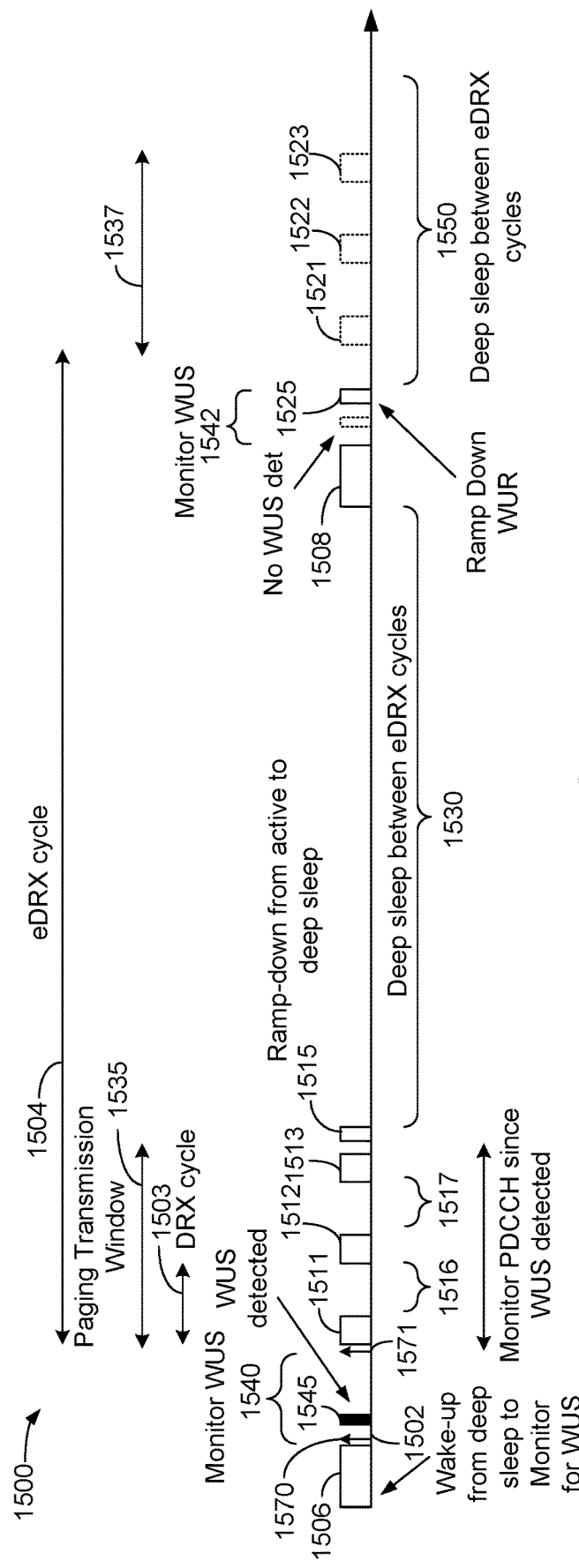
FIG. 15 is a diagram showing an exemplary embodiment of using one wake-up signal for all PDCCH search spaces in one paging transmission window (PTW).

FIG. 15 is a diagram 1500 showing an exemplary embodiment of using one wake-up signal for all PDCCH search spaces in one paging transmission window (PTW). In an exemplary embodiment, the eDRX cycle 1504 is shown on a UE timeline 1502. A wake-up period 1506 occurs during which time a UE awakens from a deep sleep period. In this exemplary embodiment, during the wake-up period 1506, a wake-up receiver, such as the wake-up receiver 1220 in FIG. 12, may be used to monitor for a wake-up signal. In an exemplary embodiment the UE may load its full software (SW) image files, or a partial set of SW image files, and may perform other functions that allow it to awaken and monitor for a wake-up signal. In this exemplary embodiment, the wake-up receiver 1220 may monitor for a wake-up signal during an exemplary time period 1540. The time period 1540 may be referred to as a wake-up signal search space, or a wake-up signal monitoring window. The time period 1540 comprises the time available to a base station for sending one or more wake-up signals to a UE. If more than one wake-up signal is sent during the time period 1540, then the time period 1540 also includes any time between wake-up signals, and/or wake-up signal search spaces. In this exemplary embodiment, a wake-up signal 1545 is detected by the UE during the time period 1540, and as a result of detecting the wake-up signal 1545, the UE then begins to monitor the PDCCH channel. In an exemplary embodiment, the length of the time period 1540 may be configured during the RRC establishment, or may be determined based on Rmax/TxD/DRX cycle etc. In an exemplary embodiment, depending on the design selected for wake-up signal implementation, timing/frequency synchronization may be performed using the wake-up signal 1545, or one or more pilot signals prior to monitoring the wake-up signal. The monitoring period for the timing/frequency synchronization signals may be at least part of a receiver implementation so it may not be predefined in the specification. The length of the wake-up signal may be predefined.

In an exemplary embodiment, one or more pilot signals, an exemplary one of which is shown using reference numeral 1570, may be located in one or more of the vicinity of a wake-up signal, and the vicinity of a PDCCH communication. In an exemplary embodiment, a pilot signal 1570 is always located in the vicinity of a wake-up signal regardless of whether the wake-up signal is actually sent. In an exemplary embodiment, a pilot signal 1570 is sent in the vicinity of the wake-up signal only when the wake-up signal is transmitted. In an exemplary embodiment, a pilot signal 1571 may be located in a vicinity of the PDCCH communication only when the wake-up signal is sent. In an exemplary embodiment, the density (i.e., the number) of pilot signals may be increased in the vicinity of a wake-up signal. As used herein, the term "vicinity' as in the pilot signal 1570 being located in the vicinity of a wake-up signal or the pilot signal 1571 being in the vicinity of a PDCCH communication may refer to the pilot signal 1570 being located in the time period 1540, and/or a pilot signal 1571 being located in a paging transmission window 1535.

After the wake-up signal 1545 is detected and after the search space 1540, the paging transmission window 1535 begins, during which the UE is awake and monitoring a PDCCH channel to determine whether a base station has any information destined for that UE, and during which the UE may decode the PDCCH channel to alert a base station that the UE may have information to transmit to the base station. In this exemplary embodiment, the paging transmission window 1535 may comprise a number of PDCCH monitoring periods and the spacing between PDCCH monitoring periods, with PDCCH monitoring periods 1511, 1512, and 1513, and time periods 1516 and 1517 shown as illustrative examples only. After the PDCCH monitoring periods, the paging transmission window 1535 concludes with a ramp-down period 1515, during which time the UE ramps down and reenters a deep sleep state 1530. The paging transmission window 1535 also includes an exemplary DRX cycle 1503, which may include one PDCCH monitoring period 1511 followed by a time period 1516 where the UE may enter a light sleep state. Similarly, another DRX cycle may comprise the PDCCH monitoring period 1512, which may be followed by a time period 1517 where the UE may enter a light sleep state. Light sleep may also occur in a DRX cycle comprising the last PDCCH monitoring period 1513 and the ramp-down period 1515.

Similarly, a wake-up period 1508 may occur after the deep sleep state 1530, during which time a UE again awakens from a deep sleep period. During the wake-up period 1508, the UE may load its full software (SW) image files, or a partial set of SW image files, and may perform other functions that allow it to awaken and monitor for a wake-up signal. In this exemplary embodiment, the wake-up receiver 1220 may monitor for a wake-up signal during an exemplary time period 1542, which may be similar to the time period 1540. In this exemplary embodiment, no wake-up signal is detected during the time period 1542, and as a result of not detecting the wake-up signal, the UE immediately enters the ramp-down period 1525 and enters a deep sleep state during the time period 1550. The time period 1550 is shown as occurring during the paging transmission window 1537, thus allowing the UE to conserve significant amount of power because it need not monitor the PDCCH channel during the paging transmission window 1537, as shown by illustrating the PDCCH monitoring periods 1521, 1522 and 1523 using dotted line.

Figure 16:
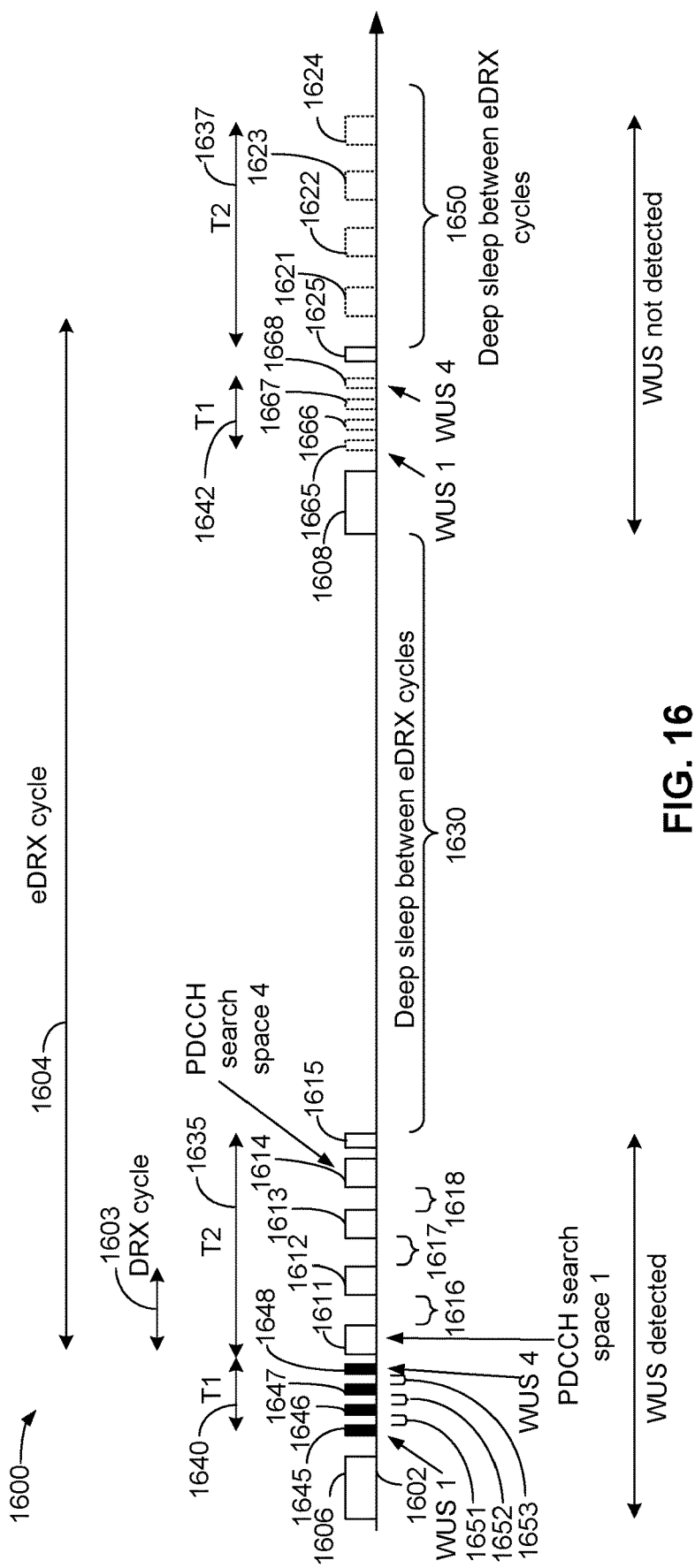
FIG. 16 is a diagram showing an exemplary embodiment where the time to monitor for a wake-up signal is smaller than the time to monitor all PDCCH search spaces.

FIG. 16 is a diagram 1600 showing an exemplary embodiment where the time to monitor for wake-up signals is smaller than the time to monitor all PDCCH search spaces by configuring the spacing between wake-up signals to be smaller than the spaces between PDCCH search spaces. In an exemplary embodiment, the eDRX cycle 1604 is shown on a UE timeline 1602. A wake-up period 1606 occurs during which time a UE awakens from a deep sleep period. In this exemplary embodiment, during the wake-up period 1606, a wake-up receiver, such as the wake-up receiver 1220 in FIG. 12, may be used to monitor for a wake-up signal. In an exemplary embodiment, the UE may load its full software (SW) image files, or a partial set of SW image files, and may perform other functions that allow it to awaken and monitor for a wake-up signal (WUS). In this exemplary embodiment, the wake-up receiver 1220 may monitor for a wake-up signal during an exemplary time period 1640. In an exemplary embodiment, the time period 1640 may include a number of separate wake-up signal monitoring periods during which a UE may monitor for different wake-up signals. In this exemplary embodiment, the time period 1640 during which the UE searches for a wake-up signal is smaller than the time period 1635 that the UE monitors all PDCCH search spaces, such that the spacing 1651, 1652 and 1653 between the wake-up signal search spaces 1645, 1646, 1647 and 1648, is smaller than the spacing 1616, 1617 and 1618 between the PDCCH search spaces 1611, 1612, 1613 and 1614.

A wake-up signal may correspond to a corresponding PDCCH paging transmission window. For example, a wake-up signal (wake-up signal 1) detected in search space 1645 may correspond to the PDCCH search space 1611 (PDCCH search space 1). Having multiple locations to send a PDCCH communication allows scheduling flexibility at the base station. For example, if a base station has high priority data to send to a UE in a first PDCCH location (for example, PDCCH search space 1611) the base station can still page another UE by using another location, such as PDCCH search space 1612, 1613 or 1614 in this example. In this manner, the ability to send multiple wake-up signals provides flexibility at the base station.

In another exemplary embodiment, each wake-up signal may correspond to one or more of the PDCCH monitoring occasions. For example if a wake-up signal is detected in location 1 (search space 1645), then the UE may monitor for a corresponding PDCCH communication only in location 1 (search space 1611). If a wake-up signal is detected in location 2 (search space 1646), then the UE may monitor for a corresponding PDCCH communication only in location 2 (search space 1612), and so on for wake-up signal search spaces 1647 and 1648, and PDCCH monitoring locations 1613 and 1614, respectively. In an alternative exemplary embodiment, a UE may monitor all PDCCH locations if a wake-up signal is detected in any of the four (4) locations shown in this example. This alternative exemplary embodiment may provide additional scheduling flexibility at a base station. Because a UE only monitors the PDCCH when the wake-up signal is detected, impact on power consumption of this alternative exemplary embodiment may be small.

In an exemplary embodiment, the spacing 1651, 1652 and 1653 between the wake-up signal search spaces 1645, 1646, 1647 and 1648, respectively, and the duration of the wake-up signal search spaces 1645, 1646, 1647 and 1648, which determines T1, may be the same as the spacing 1616, 1617 and 1618 between PDCCH search spaces 1611, 1612, 1613 and 1614, respectively, and the duration of the PDCCH search spaces 1611, 1612, 1613 and 1614, which determines T2. Alternatively, the spacing 1651, 1652 and 1653 between the wake-up signal search spaces 1645, 1646, 1647 and

1648, respectively, and the duration of the wake-up signal search spaces 1645, 1646, 1647 and 1648, which determines T1, and the spacing 1616, 1617 and 1618 between PDCCH search spaces 1611, 1612, 1613 and 1614, respectively, and the duration of the PDCCH search spaces 1611, 1612, 1613 and 1614, which determines T2 may be independently configured, as making T1 smaller than T2 may reduce scheduling flexibility but help reduce total awake time. In an exemplary embodiment, the time period T1, referring to the number of wake-up signal search spaces in the eDRX cycle 1604, may be configured separately from the duration of the paging transmission window 1635 and the number of DRX cycles 1603 to monitor for the PDCCH in the eDRX cycle 1604.

In this exemplary embodiment, one or more wake-up signals 1645, 1646, 1647 and 1648 may be detected and the UE continues to monitor for one or more PDCCH communications 1611, 1612, 1613 and 1614 until the ramp-down period 1615. The time period 1635 also includes a DRX cycle 1603, which may include a time period 1616 where the UE may enter a light sleep state. Similarly, the PDCCH monitoring period 1612 may be followed by a time period 1617 where the UE may enter a light sleep state, and the PDCCH monitoring period 1613 may be followed by a time period 1618 where the UE may enter a light sleep state. Light sleep may also occur between the last PDCCH monitoring period 1614 and the ramp-down period 1615.

Similarly, a wake-up period 1608 may occur after the deep sleep state 1630, during which time a UE again awakens from a deep sleep period. During the wake-up period 1608, the UE may load its full software (SW) image files, or a partial set of SW image files, and may perform other functions that allow it to awaken and monitor for a wake-up signal. In this exemplary embodiment, the wake-up receiver 1220 may monitor for a wake-up signal during an exemplary time period 1642. In this exemplary embodiment, no wake-up signal is detected during the time period 1642, and as a result of not detecting the wake-up signal, shown by dotted line in time periods 1665, 1666, 1667 and 1668, the UE immediately enters the ramp-down period 1625 and enters a deep sleep state during the time period 1650. The time period 1650 is shown as occurring during the time period 1637, thus allowing the UE to conserve significant amount of power because it need not monitor the PDCCH channel, as shown by illustrating the PDCCH monitoring periods 1621, 1622, 1623, and 1624 using dotted line.

Figure 17:
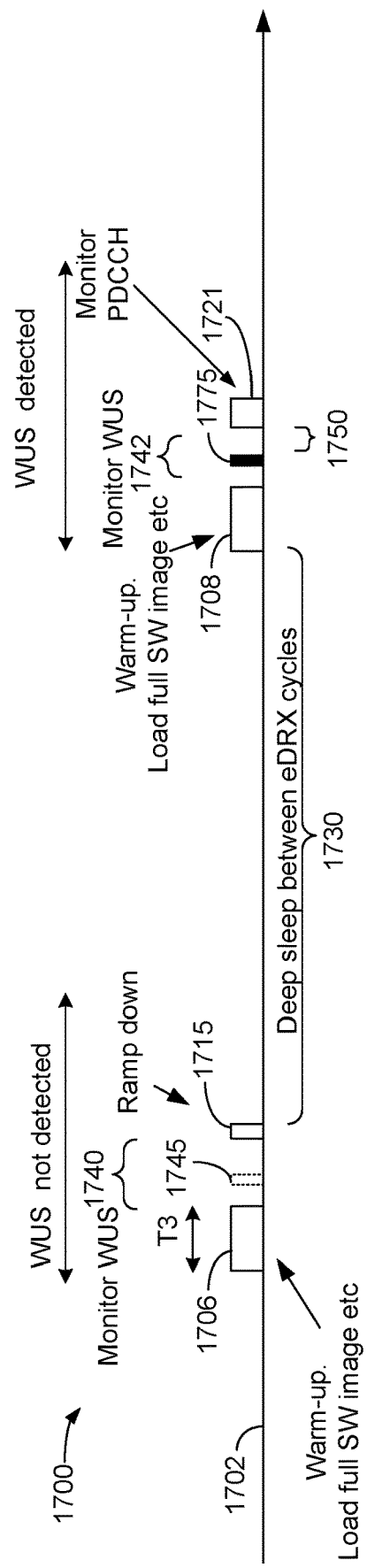
FIG. 17 is a diagram showing an exemplary embodiment of loading software (SW) image data in a UE.

FIG. 17 is a diagram 1700 showing a first exemplary embodiment of loading software (SW) image data in a UE. In an exemplary embodiment, a UE timeline 1702 shows a wake-up period 1706, during which time a UE awakens from a deep sleep period. During the wake-up period 1706, the UE may load its full software (SW) image files and may perform other functions that allow it to awaken and monitor a PDCCH channel. In this exemplary embodiment a period of time, referred to as T3, shows the duration of the SW load for the UE. During the time period 1740, the UE monitors for a wake-up signal, shown in monitoring time period 1745. In this exemplary embodiment, no wake-up signal is detected and the UE ramps down in time period 1715, and enters deep sleep period 1730.

A wake-up period 1708 follows the deep sleep period 1730, during which the UE again awakens and loads its full software (SW) image files and may perform other functions that allow it to awaken and monitor a PDCCH channel. In an exemplary embodiment, the UE monitors for a wake-up signal in time period 1742, and in this exemplary embodiment, detects a wake-up signal in time period 1775, and then monitors the PDCCH channel, shown illustratively by PDCCH monitoring time period 1721.

Figure 18:
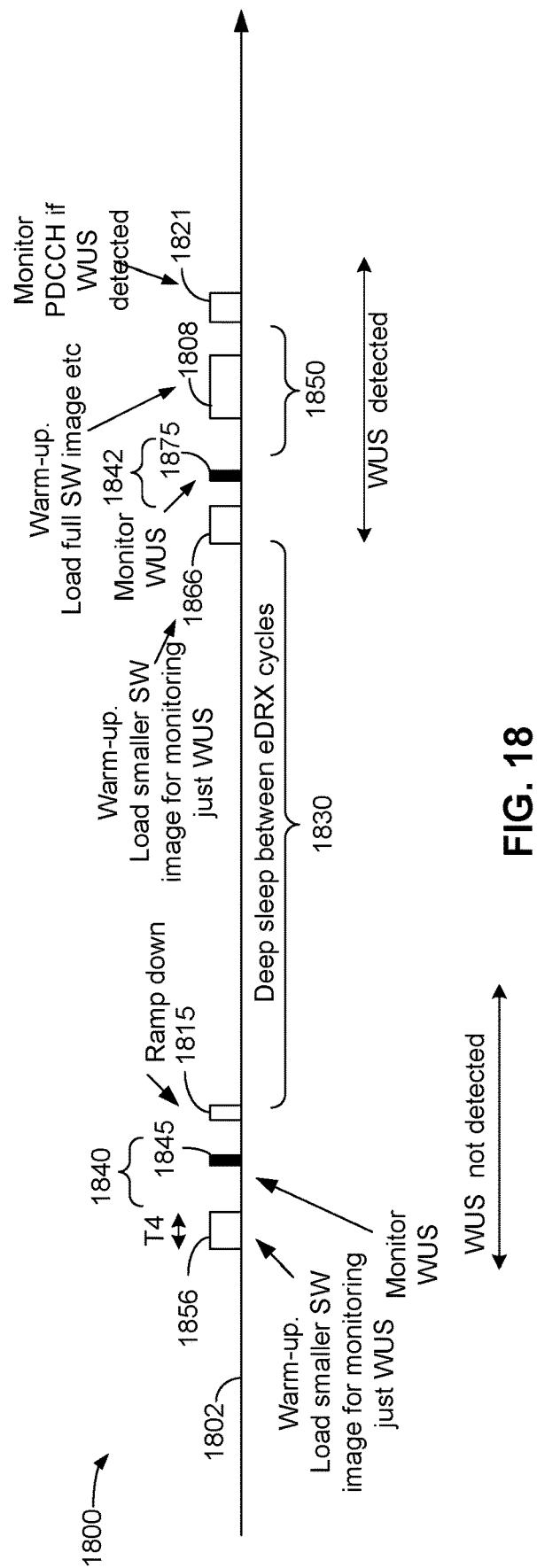
FIG. 18 is a diagram showing an alternative exemplary embodiment of loading software (SW) image data in a UE.

FIG. 18 is a diagram 1800 showing an alternative exemplary embodiment of loading software (SW) image data in a UE. In an exemplary embodiment, a UE timeline 1802 shows a wake-up period 1856, during which time a UE awakens from a deep sleep period. In an exemplary embodiment, during the wake-up period 1856, the UE may load a software image that may be smaller than a full SW image. In an exemplary embodiment, the software image loaded during time period 1856 may be a software image that may allow the wake-up receiver 1220 (FIG. 12) to monitor for a wake-up signal. In this exemplary embodiment a period of time, referred to as T4, shows the duration of the SW image load for the UE, with the time period T4 being significantly shorter, and taking significantly fewer UE resources, than does the time period T3 shown in FIG. 17. During the time period 1840, the UE monitors for a wake-up signal, shown in monitoring time period 1845. In this exemplary embodiment, no wake-up signal is detected and the UE ramps down in time period 1815, and enters deep sleep period 1830.

A wake-up period 1866 follows the deep sleep period 1830, during which the UE again awakens and loads a software image that may be smaller than a full SW image. In an exemplary embodiment, the software image loaded during time period 1866 may be a software image that may allow the wake-up receiver 1220 (FIG. 12) to monitor for a wake-up signal, similar to the SW image loaded in time period 1856. In an exemplary embodiment, the UE monitors for a wake-up signal in time period 1842, and, in this exemplary embodiment, detects a wake-up signal in time period 1875. In accordance with this exemplary embodiment, after a wake-up signal is detected in time period 1875, the UE then proceeds to load its full SW image in time period 1808, and then monitors the PDCCH channel, shown illustratively by PDCCH monitoring time period 1821. Initially loading a smaller SW image for wake-up signal detection only allows a UE to save significant resources, particularly in the case where no wake-up signal is ultimately detected.

In an exemplary embodiment, for short DRx/eDRX cycles, the UE may not enter a deep sleep period, so the full SW image is always loaded in memory. Therefore, a gap, such as gap 1750 of FIG. 17, between the wake-up signal 1775 and a corresponding PDCCH search space 1721 can be relatively small. For long DRX/eDRX cycles, the UE may enter deep sleep, so when exiting deep sleep, the UE may need to load its full SW image, so that a gap, such as gap 1850 of FIG. 18, between the wake-up signal 1875 and a corresponding PDCCH search space 1821 can be larger than the gap 1750.

In an exemplary embodiment, the gap between the wake-up signal and a corresponding control channel search space may be configured based on one or more of the UE's capability and discontinuous reception (DRX)/extended (eDRX) cycle length.

Figure 19:
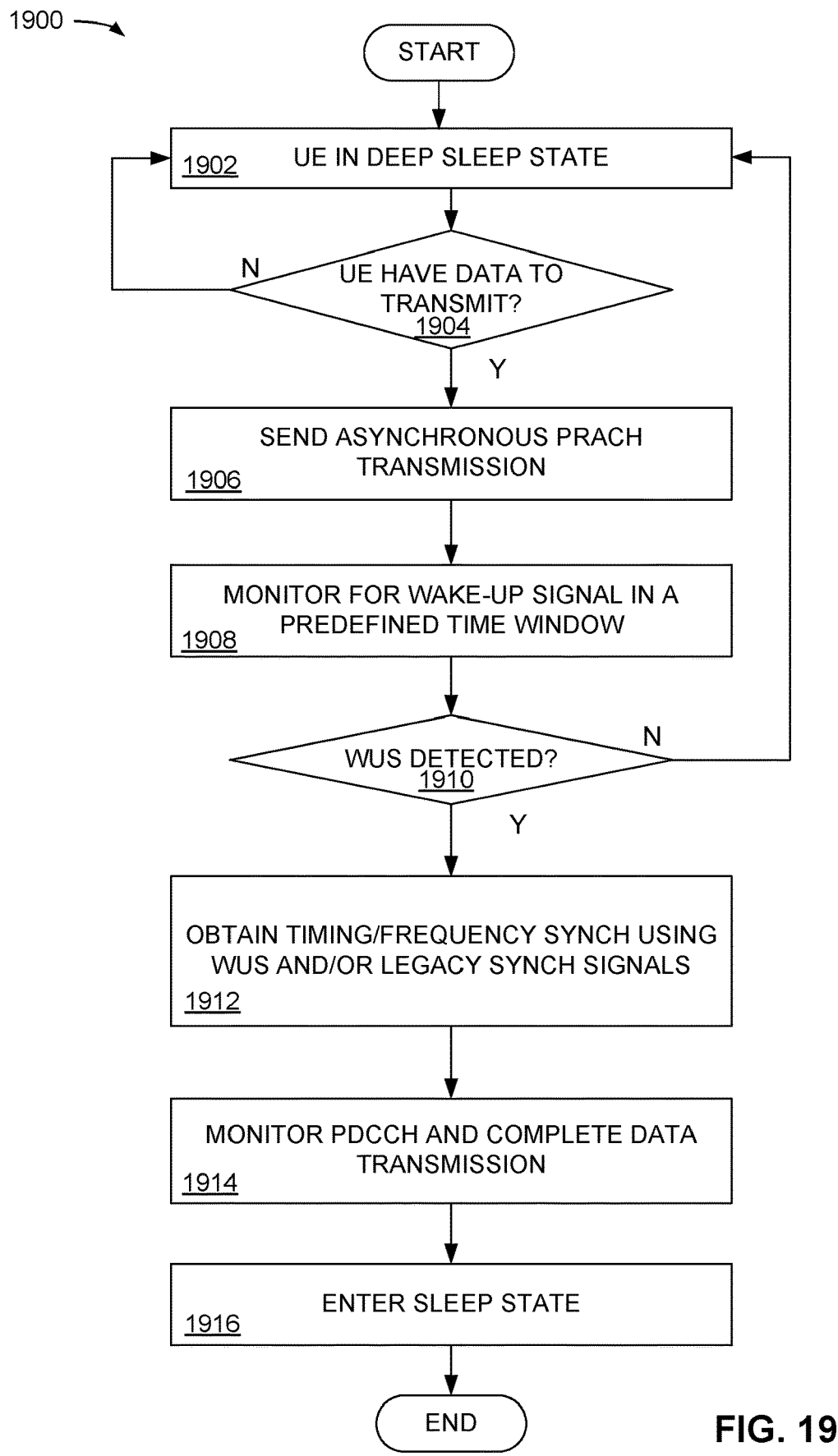
FIG. 19 is a flow chart showing a method of processing a wake-up signal at a UE.

FIG. 19 is a flow chart 1900 showing a method of processing a wake-up signal at a UE. The blocks in the method 1900 may be performed in or out of the order shown. One or more of the blocks in the method 1900 may be performed in parallel with one or more other blocks in the method 1900.

In block 1902, a UE may be in a deep sleep state, such as in deep sleep state 1530 between eDRX cycles.

In block 1904, it is determined whether the UE has data to transmit. If it is determined in block 1904 that a UE does not have data to transmit, the process returns to block 1902.

If it is determined in block 1904 that a UE does have data to transmit, the process proceeds to block 1906.

In block 1906, a UE sends an asynchronous physical random access channel (PRACH) communication to a base station informing the base station that the UE has data to transmit.

In block 1908, the UE then monitors for a wake-up signal in a monitoring window. In an exemplary embodiment, the monitoring window may be defined by the RRC configuration, or may be a predefined period of time.

In block 1910, it is determined whether a wake-up signal is detected. If it is determined in block 1910 that a wake-up signal is not detected, then the UE ramps down and reenters deep sleep. If it is determined in block 1910 that a wake-up signal is detected, then the process proceeds to block 1912.

In block 1912, the UE obtains timing and frequency synchronization from the base station using the wake-up signal or another signal.

In block 1914, the UE begins monitoring the PDCCH channel for communications from the base station and completes its data transmission.

In block 1916, the UE reenters a deep sleep state.

Figure 20:
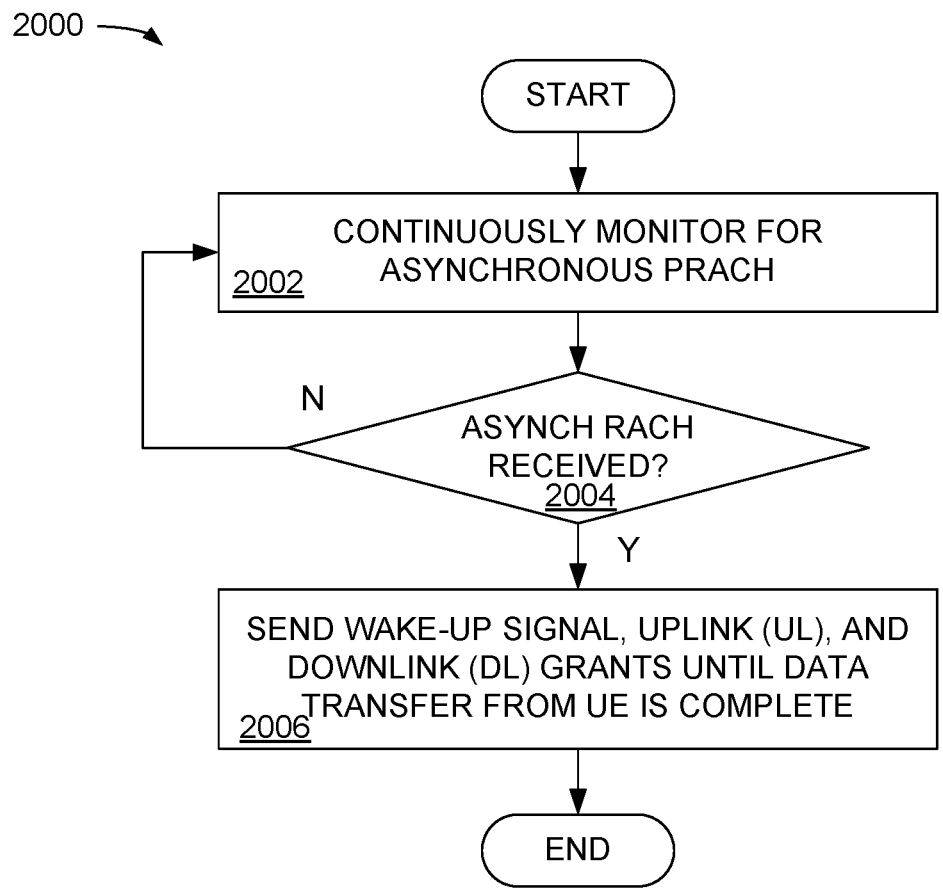
FIG. 20 is a flow chart showing a method of processing a wake-up signal at a base station.

FIG. 20 is a flow chart 2000 showing a method of processing a wake-up signal at a base station. The blocks in the method 2000 may be performed in or out of the order shown. One or more of the blocks in the method 2000 may be performed in parallel with one or more other blocks in the method 2000.

In block 2002, a base station continuously monitors for an asynchronous PRACH communication from a UE.

In block 2004, it is determined whether an asynchronous PRACH communication is received. If it is determined in block 2004 that an asynchronous PRACH communication is not received, the process returns to block 2002. If it is determined in block 2004 that an asynchronous PRACH communication is received, the process proceeds to block 2006.

In block 2006, the base station sends a wake-up signal to a UE, sends uplink (UL), and downlink (DL), resource grants until data transmission from the UE is complete.

Figure 21:
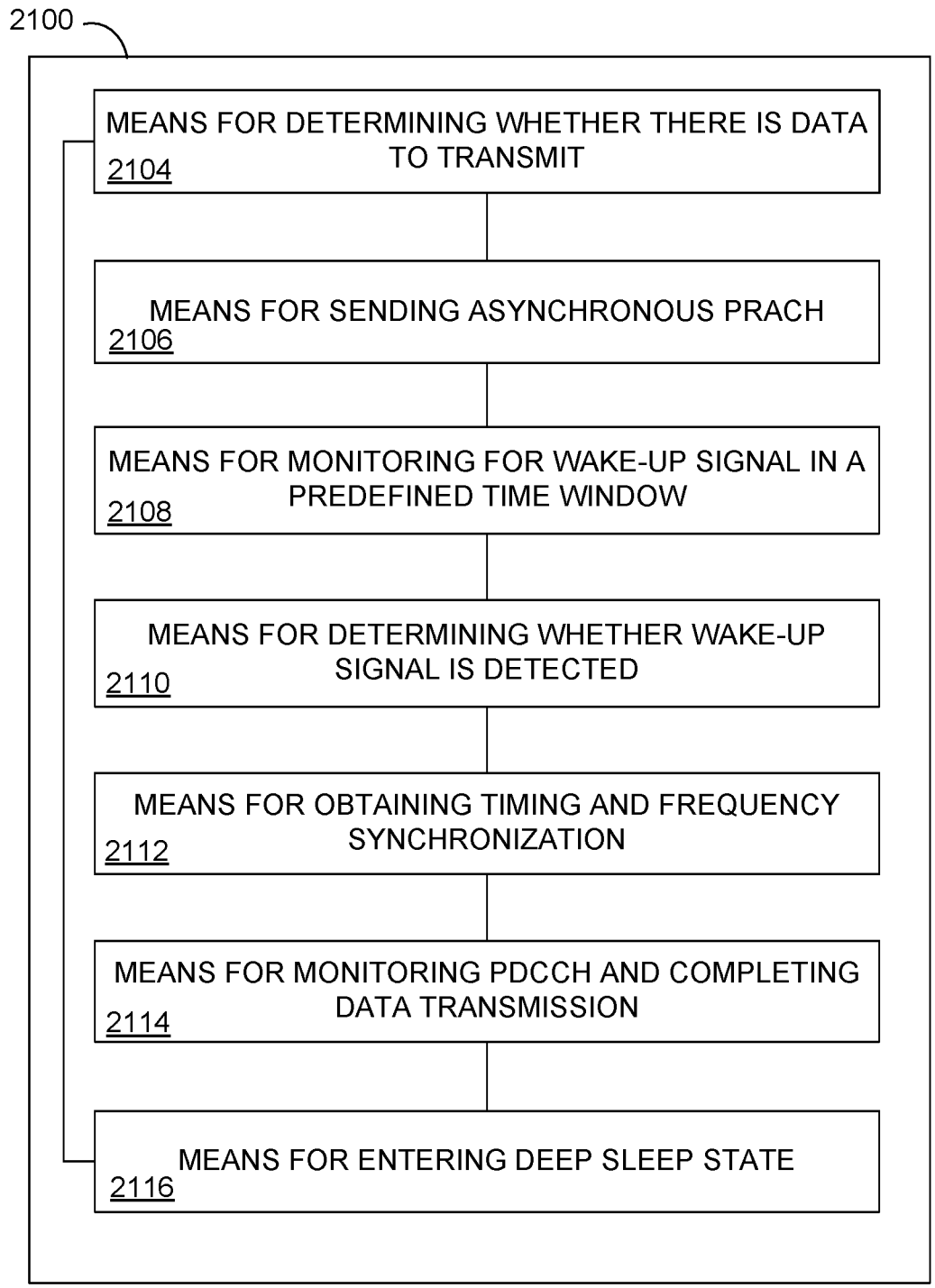
FIG. 21 is a functional block diagram of an apparatus for a UE processing a wake-up signal in accordance with an exemplary embodiment of the disclosure.

FIG. 21 is a functional block diagram of an apparatus 2100 for a UE processing a wake-up signal in accordance with an exemplary embodiment of the disclosure. The apparatus 2100 comprises means 2104 for determining whether there is data to transmit. In certain embodiments, the means 2104 for determining whether there is data to transmit can be configured to perform one or more of the functions described in operation block 1904 of method 1900 (FIG. 19). In an exemplary embodiment, the means 2104 for determining whether there is data to transmit may comprise the UE 650 (FIG. 6) determining whether it has data to transmit.

The apparatus 2100 further comprises means 2106 for sending an asynchronous PRACH communication. In certain embodiments, the means 2106 for sending an asynchronous PRACH communication can be configured to perform one or more of the functions described in operation block 1906 of method 1900 (FIG. 19). In an exemplary embodiment, the means 2106 for sending an asynchronous PRACH communication may comprise the UE 650 sending an asynchronous PRACH (or any other asynchronous RACH) communication of the base station 610 (FIG. 6).

The apparatus 2100 further comprises means 2108 for monitoring for a wake-up signal in a monitoring window. In certain embodiments, the means 2108 for monitoring for a wake-up signal in a monitoring window can be configured to perform one or more of the functions described in operation block 1908 of method 1900 (FIG. 19). In an exemplary embodiment, the means 2108 for monitoring for a wake-up signal in a monitoring window may comprise the UE 650 monitoring for a wake-up signal in a predefined period of time, in a random time window.

The apparatus 2100 further comprises means 2110 for determining whether a wake-up signal has been detected. In certain embodiments, the means 2110 for determining whether a wake-up signal has been detected can be configured to perform one or more of the functions described in operation block 1910 of method 1900 (FIG. 19). In an exemplary embodiment, the means 2110 for determining whether a wake-up signal has been detected may comprise the UE 650 determining whether it has received a wake-up signal in a monitoring window.

The apparatus 2100 further comprises means 2112 for obtaining timing and frequency synchronization. In certain embodiments, the means 2112 for obtaining timing and frequency synchronization can be configured to perform one or more of the functions described in operation block 1912 of method 1900 (FIG. 19). In an exemplary embodiment, the means 2112 for obtaining timing and frequency synchronization may comprise the UE 650 obtaining timing and frequency synchronization from a base station using the wake-up signal, or another signal.

The apparatus 2100 further comprises means 2114 for monitoring a PDCCH communication and completing data transmission. In certain embodiments, the means 2114 for monitoring a PDCCH communication and completing data transmission can be configured to perform one or more of the functions described in operation block 1914 of method 1900 (FIG. 19). In an exemplary embodiment, the means 2114 for monitoring a PDCCH communication and completing data transmission may comprise the UE 650 monitoring the PDCCH channel for communications from the base station and completing its data transmission.

The apparatus 2100 further comprises means 2116 for entering a deep sleep state. In certain embodiments, the means 2116 for entering a deep sleep state can be configured to perform one or more of the functions described in operation block 1916 of method 1900 (FIG. 19). In an exemplary embodiment, the means 2116 for entering a deep sleep state may comprise the UE 650 completing its data transmission and entering a deep sleep state.

Figure 22:
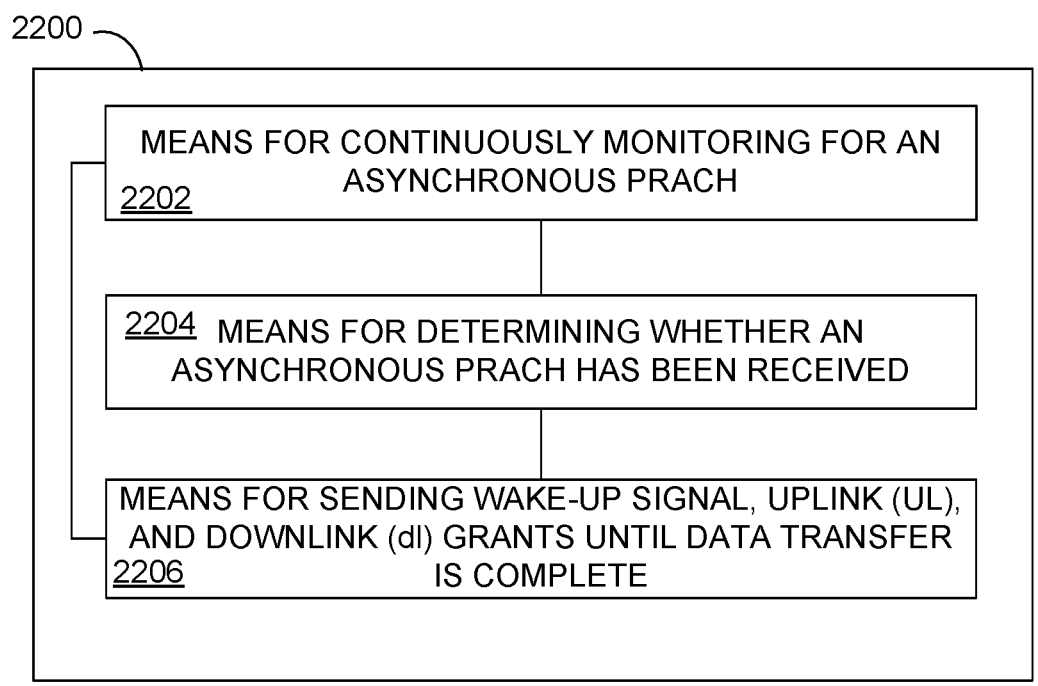
FIG. 22 is a functional block diagram of an apparatus for a base station processing a wake-up signal in accordance with an exemplary embodiment of the disclosure.

FIG. 22 is a functional block diagram of an apparatus 2200 for a base station processing a wake-up signal in accordance with an exemplary embodiment of the disclosure. The apparatus 2200 comprises means 2202 for continuously monitoring for an asynchronous PRACH communication. In certain embodiments, the means 2202 for continuously monitoring for an asynchronous PRACH communication can be configured to perform one or more of the functions described in operation block 2002 of method 2000 (FIG. 20). In an exemplary embodiment, the means 2202 for continuously monitoring for an asynchronous PRACH communication may comprise the base station 610 continuously monitoring for an asynchronous PRACH communication from the UE 650.

The apparatus 2200 further comprises means 2204 for determining whether an asynchronous PRACH communication has been received. In certain embodiments, the means 2204 for determining whether an asynchronous PRACH communication has been received can be configured to perform one or more of the functions described in operation block 2004 of method 2000 (FIG. 20). In an exemplary embodiment, the means 2204 for determining whether an asynchronous PRACH communication has been received may comprise the base station 610 determining whether an asynchronous PRACH communication has been received from the UE 650.

The apparatus 2200 further comprises means 2206 for sending a wake-up signal to a UE, and sending uplink (UL), and downlink (DL), resource grants until data transmission from the UE is complete. In certain embodiments, the means 2206 for sending a wake-up signal to a UE, and sending uplink (UL), and downlink (DL), resource grants until data transmission from the UE is complete can be configured to perform one or more of the functions described in operation block 2006 of method 2000 (FIG. 20). In an exemplary embodiment, the means 2206 for sending a wake-up signal to a UE, and sending uplink (UL), and downlink (DL), resource grants until data transmission from the UE is complete may comprise the base station 610 sending a wake-up signal to a UE, and sending uplink (UL), and downlink (DL), resource grants until data transmission from the UE 610 is complete.

In an exemplary embodiment, the wake-up signal could use the same search space concept as PDCCH with the length reduced from PDCCH search space length to WUS search space length. This allows UEs receiving a PDCCH communication in different regions to be awakened independently. It also allows the length of the wake-up signal to be proportional to the PDCCH repetition level in a straightforward manner.

In an exemplary embodiment, the UE may perform blind detection of a wake-up signal for multiple lengths of the wake-up signal and one or more positions.

In an exemplary embodiment, the eNB (base station) scheduler may increase the wake-up signal search space length used for a UE over time. For example if on sending the wake-up signal the first few times with a particular length, and UE doesn't respond, the eNB could increase the wake-up signal search space length in future attempts.

Switching Between Wake-Up Signal Monitoring and Direct PDCCH Monitoring

Although the network may configure the wake-up signal, a UE may determine whether it wishes to monitor for the wake-up signal first or monitor PDCCH directly.

In some UE implementations, e.g., for small Rmax, it may be more power efficient for a UE to directly monitor the PDCCH. The UE may choose not to monitor the wake-up signal in those cases.

In an exemplary embodiment, an eNB (base station) can configure the use of a wake-up signal based on Rmax/traffic pattern.

Use of Wake-Up Signal with Async RACH

In an exemplary embodiment, to reduce power consumption, it may be preferred to allow a UE to transmit a PRACH and a PUSCH communication in the first step (first communication to the base station, such as in a communication preamble), and in the second step (second communication between a base station and a UE) to receive a wake-up signal and a PDCCH communication. The UE may not need to synchronize to the network before the first step or even acquire MIB/SIB, etc., to access the network.

Async RACH

In an exemplary embodiment, the communication network may set aside frequency resource (RBs/subcarriers etc.) for an asynchronous PRACH signal. In an exemplary embodiment, a UE can send an asynchronous PRACH communication to a base station on this resource without synchronizing to the network. In an exemplary embodiment, a UE may also send some uplink (UL) data (PUSCH), with the UE identity along with the PRACH.

In an exemplary embodiment, an eNB (base station) can be configured to continually search for the asynchronous PRACH communication from a UE. In an exemplary embodiment, the base station may be configured to respond to the UEs asynchronous PRACH communication with the wake-up signal and the PDCCH upon detecting the asynchronous PRACH, allowing the UE to possibly synchronize to the network using the wake-up signal and/or the PDCCH communication.

Wake-Up Signal and PDCCH

In an exemplary embodiment, upon detecting the asynchronous PRACH, the eNB (base station) could transmit a wake-up signal on the downlink (DL). This may be a predetermined time unit later/or within a timing window, etc.

In an exemplary embodiment, the UE could search for the wake-up signal and obtain timing/frequency sync through the wake-up signal. The wake-up signal/timing synchronization could provide information about subframe boundary/frame boundary, etc. The UE can then go on to decode the PDCCH whose location/search space may be derived based on the location of the wake-up signal or information contained in the wake-up signal. The scrambling on PDCCH, etc., may be done in such a manner that the UE is able to decode it by just information it gleans from the WUS (for example, the UE does not need to decode PBCH).

In an exemplary embodiment, the PDCCH may contain subsequent UL/DL grants etc.

In an exemplary embodiment, the UE may continue to monitor for PDCCH directly or wake-up signal and PDCCH based on pending DL/UL data, etc., until timeouts or based on instructions from the eNB (base station).

PDCCH Delay Indication

In an exemplary embodiment, a PDCCH within the DRX on period may contain information for a UE or group of UEs on delaying the DRX on time for subsequent search spaces. This may be applied to idle mode DRX as well. The delay could be function of the configured Rmax in addition to information contained in the downlink control information (DCI). In an exemplary embodiment, the wake-up signal could contain an indication of delay directly instead of decoding PDCCH to determine the delay.

In an exemplary embodiment, the UE could monitor for the wake-up signal after the delay or directly look for PDCCH after the delay.

TxD and Signal Design

In an exemplary embodiment, if beam sweeping is used for TxD, the UE should be aware of how many subframes contain the same beam, after how many subframes the beam could change, etc., so the UE can perform coherent beam combining appropriately.

In an exemplary embodiment, when PDCCH Rmax is 1, for example, the length of the wake-up signal will likely be a few OFDM symbols. Signals designed for ultra low latency/shortened transmission time interval (ULL/sTTI) communications, which are also meant to be decodable in a few OFDM symbols, could be reused for the wake-up signal. The wake-up signal for longer lengths could be based on repetitions of a ULL/sTTI signal possibly with additional spreading/scrambling, etc.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communication, comprising:
periodically awakening from a discontinuous reception state;
monitoring, upon awakening, for a wake-up signal (WUS) in a wake-up signal search space, the wake-up signal having a shorter length than a length of a control channel communication, wherein the length of the wake-up signal is dependent on one or more of a configured control channel repetition number (Rmax), actual control channel repetition level, transmit diversity architecture, a frequency hopping plan, or a discontinuous reception (DRX)/extended (eDRX) cycle length; and
monitoring a control channel for the control channel communication in response to detecting the WUS in the wake-up signal search space.

2. The method of claim 1, wherein a pilot signal is located in a vicinity of the wake-up signal regardless of whether the wake-up signal is sent.

3. The method of claim 1, wherein a pilot signal is sent in a vicinity of the wake-up signal only when the wake-up signal is sent.

4. The method of claim 1, wherein a pilot signal is located in a vicinity of the control channel communication only when the wake-up signal is sent.

5. The method of claim 1, wherein a density of pilot signals is increased in a vicinity of the wake-up signal.

6. The method of claim 1, wherein the wake-up signal comprises information relating to a number of discontinuous reception (DRX) cycles to monitor for the control channel communication within an extended DRX (eDRX) cycle.

7. The method of claim 1, wherein a length of the wake-up signal is explicitly configured.

8. The method of claim 1, wherein the wake-up signal search space comprises one or more lengths and corresponding one or more starting locations, and the wake-up signal having the one or more lengths is searched for at all corresponding starting locations in the wake-up signal search space.

9. The method of claim 1, wherein the wake-up signal search space is smaller than a search space for the control channel communication.

10. The method of claim 1, wherein the wake-up signal search space allows more than one user equipment (UE) receiving a control channel communication in different areas to be awakened independently.

11. The method of claim 1, further comprising selecting between awakening to search for the wake-up signal or the control channel communication.

12. The method of claim 1, wherein the method further comprises transmitting a physical random access channel (PRACH) and a physical uplink shared channel (PUSCH) communication to a base station in a first communication and receivinges a wake-up signal and a physical downlink control channel (PDCCH) communication in a second communication.

13. The method of claim 12, wherein the method further comprises using the wake-up signal and PDCCH communication to synchronize to a communication network.

14. The method of claim 1, wherein a gap between the wake-up signal and a corresponding control channel search space is configured based on one or more of user equipment (UE) capability and discontinuous reception (DRX)/extended (eDRX) cycle length.

15. The method of claim 14, wherein the method further comprises informing a base station about the gap between the wake-up signal and the corresponding control channel search space for different DRX/eDRX cycles.

16. The method of claim 1, wherein a number of times that for which the wake-up signal is monitored for in an extended discontinuous reception (eDRX) cycle is configured separately from a paging transmission window and a number of discontinuous reception (DRX) cycles to monitor for the control channel communication in the eDRX cycle.

17. The method of claim 16, wherein a number of locations monitored for the wake-up signal is one (1) and a number of DRX cycles of control channel communication is greater than one (1).

18. The method of claim 16, wherein spacing between multiple wake-up signals is configured independently of the control channel communication in a DRX cycle.

19. An apparatus for communication, comprising:
a memory;
a processor coupled to the memory, the memory and the processor configured to:

periodically awaken from a discontinuous reception state; and monitor, upon awakening, for a wake-up signal (WUS) in a wake-up signal search space, the wake-up signal having a shorter length than a length of a control channel communication, wherein the length of the wake-up signal is dependent on one or more of a configured control channel repetition number (Rmax), actual control channel repetition level, transmit diversity architecture, a frequency hopping plan, or a discontinuous reception (DRX)/extended (eDRX) cycle length; and monitor a control channel for the control channel communication in response to detecting the WUS in the wake-up signal search space.

20. The apparatus of claim 19, wherein the memory and the processor are further configured to monitor for a pilot signal, wherein the pilot signal is located in a vicinity of the wake-up signal regardless of whether the wake-up signal is sent.

21. The apparatus of claim 19, wherein the memory and the processor are further configured to separately configure a number of times that for which the wake-up signal is monitored for in an extended discontinuous reception (eDRX) cycle from a paging transmission window and a number of discontinuous reception (DRX) cycles to monitor for the control channel communication in the eDRX cycle.

22. The apparatus of claim 21, wherein a number of locations that are monitored for the wake-up signal is one (1) and a number of DRX cycles of control channel communication is greater than one (1).

23. The apparatus of claim 21, wherein the memory and the processor are further configured to independently configure a spacing between multiple wake-up signals in the control channel communication in a DRX cycle.

24. A user equipment (UE), comprising:
means for periodically awakening from a discontinuous reception state;
means for monitoring, upon awakening, for a wake-up signal (WUS) in a wake-up signal search space, the wake-up signal having a shorter length than a length of a control channel communication, wherein the length of the wake-up signal is dependent on one or more of a configured control channel repetition number (Rmax), actual control channel repetition level, transmit diversity architecture, a frequency hopping plan, or a discontinuous reception (DRX)/extended (eDRX) cycle length; and
means for monitoring a control channel for the control channel communication in response to detecting the WUS in the wake-up signal search space.

25. The UE of claim 24, further comprising:
means for receiving the wake-up signal (WUS);
means for processing the wake-up signal (WUS); and
means for monitoring for the control channel communication to determine whether a base station has any information destined for the UE.

26. The UE of claim 24, wherein a number of times that the UE monitors for a wake-up signal in an extended discontinuous reception (eDRX) cycle is configured separately from a paging transmission window and a number of discontinuous reception (DRX) cycles to monitor for the control channel communication in the eDRX cycle.

27. A non-transitory computer-readable medium storing computer executable code for communication, the code executable by a processor to:
periodically awaken from a discontinuous reception state;
monitor, upon awakening, for a wake-up signal (WUS) in a wake-up signal search space, the wake-up signal having a shorter length than a length of a control channel communication, wherein the length of the wake-up signal is dependent on one or more of a configured control channel repetition number (Rmax), actual control channel repetition level, transmit diversity architecture, a frequency hopping plan, or a discontinuous reception (DRX)/extended (eDRX) cycle length; and
monitor a control channel for the control channel communication in response to detecting the WUS in the wake-up signal search space.

28. The non-transitory computer-readable medium of claim 27, wherein the code is executable by a processor to monitor for a pilot signal that is located in a vicinity of the wake-up signal regardless of whether the wake-up signal is sent.

29. The non-transitory computer-readable medium of claim 27, wherein a number of times that the code is executable by a processor to monitor for a wake-up signal in an extended discontinuous reception (eDRX) cycle is configured separately from a paging transmission window and a number of discontinuous reception (DRX) cycles to monitor for the control channel communication in the eDRX cycle.

30. A method for wireless communication at a user equipment (UE), comprising:
periodically awakening from a discontinuous reception state;
monitoring, upon awakening, for a wake-up signal (WUS) in a wake-up signal search space, the wake-up signal having a shorter length than a length of a control channel communication, wherein the length of the wake-up signal is dependent on a configured control channel repetition number (Rmax); and
monitoring a control channel for the control channel communication in response to detecting the WUS in the wake-up signal search space.

31. A user equipment (UE) for wireless communication, comprising:
a memory;
a processor coupled to the memory, the memory and the processor configured to:
periodically awaken from a discontinuous reception state;
monitor, upon awakening, for a wake-up signal (WUS) in a wake-up signal search space, the wake-up signal having a shorter length than a length of a control channel communication, wherein the length of the wake-up signal is dependent on a configured control channel repetition number (Rmax); and
monitor a control channel for the control channel communication in response to detecting the WUS in the wake-up signal search space.

* * * * *